US007432629B2

(12) United States Patent
Mala et al.

(10) Patent No.: US 7,432,629 B2
(45) Date of Patent: Oct. 7, 2008

(54) ARTICULATED MEMS STRUCTURES

(75) Inventors: Mohiuddin Mala, Kanata (CA); Barrie Keyworth, Stittsville (CA); John Michael Miller, Aylmer (CA); Thomas Ducellier, Ottawa (CA); Graham McKinnon, Edmonton (CA)

(73) Assignee: JDS Uniphase Corporation, Milpitas, CA (US)

( * ) Notice: Subject to any disclaimer, the term of this patent is extended or adjusted under 35 U.S.C. 154(b) by 130 days.

(21) Appl. No.: 11/354,052

(22) Filed: Feb. 15, 2006
(Under 37 CFR 1.47)

(65) Prior Publication Data

US 2006/0222312 A1 Oct. 5, 2006

Related U.S. Application Data

(60) Provisional application No. 60/653,086, filed on Feb. 16, 2005.

(51) Int. Cl.
*H02N 1/00* (2006.01)
(52) U.S. Cl. ..................................... 310/309
(58) Field of Classification Search ................. 310/309, 310/310; 359/320, 322, 290, 291, 292, 293, 359/295, 298, 223, 224, 323
See application file for complete search history.

(56) References Cited

U.S. PATENT DOCUMENTS

| 4,317,611 A | 3/1982 | Petersen ..................... 359/214 |
| 4,662,746 A | 5/1987 | Hornbeck .................... 359/223 |
| 4,710,732 A | 12/1987 | Hornbeck .................... 359/291 |
| 4,956,619 A | 9/1990 | Hornbeck .................... 359/317 |
| 5,061,049 A | 10/1991 | Hornbeck .................... 359/224 |
| 5,079,545 A | 1/1992 | Priem et al. .................. 345/628 |
| 5,083,857 A | 1/1992 | Hornbeck .................... 359/291 |
| 5,105,369 A | 4/1992 | Nelson ..................... 250/201.4 |
| 5,172,262 A | 12/1992 | Hornbeck .................... 359/223 |
| 5,278,652 A | 1/1994 | Urbanus et al. ............. 348/571 |

(Continued)

FOREIGN PATENT DOCUMENTS

CA 2429508 11/2003

(Continued)

OTHER PUBLICATIONS

Thor Juneau et al., "Single-Chip 1×84 MEMS Mirror Array for Optical Telecommunication Applications"; Proceedings of SPIE MOEMS and Miniaturized Systems III, Jan. 27-29, 2003, vol. 4983, pp. 53-64.

(Continued)

*Primary Examiner*—Hung X. Dang
*Assistant Examiner*—Tuyen Q Tra
(74) *Attorney, Agent, or Firm*—Teitelbaum & MacLean; Neil Teitelbaum; Doug MacLean

(57) ABSTRACT

The present invention relates to an articulated micro-electro-mechanical (MEMS) device, which is constructed in such a way as to enable several of the devices to be closely packed together, i.e. high fill factor, for redirecting specific wavelengths of light from a dispersed optical signal to different output ports. The articulated MEMS device includes multiple pivotally connected sections that are pivotable about two perpendicular axes for limiting the amount of dynamic crosstalk as the device is rotated between different positions.

17 Claims, 21 Drawing Sheets

U.S. PATENT DOCUMENTS

| | | | |
|---|---|---|---|
| 5,469,302 A | 11/1995 | Lim | 359/846 |
| 5,535,047 A | 7/1996 | Hornbeck | 359/295 |
| 5,543,956 A | 8/1996 | Nakagawa et al. | 359/225 |
| 5,579,148 A | 11/1996 | Nishikawa et al. | 359/214 |
| 5,629,790 A | 5/1997 | Neukermans et al. | 359/198 |
| 5,661,591 A | 8/1997 | Lin et al. | 359/290 |
| 5,920,417 A | 7/1999 | Johnson | 359/223 |
| 6,044,705 A | 4/2000 | Neukermans et al. | 73/504.02 |
| 6,198,565 B1 | 3/2001 | Iseki et al. | 359/224 |
| 6,201,629 B1 | 3/2001 | Mcclelland et al. | 359/223 |
| 6,259,548 B1 | 7/2001 | Tsugai et al. | 359/224 |
| 6,315,423 B1 | 11/2001 | Yu et al. | 359/872 |
| 6,327,855 B1 | 12/2001 | Hill et al. | 60/528 |
| 6,392,220 B1 | 5/2002 | Slater et al. | 250/216 |
| 6,431,714 B1 | 8/2002 | Sawada et al. | 359/879 |
| 6,454,421 B2 | 9/2002 | Yu et al. | 359/872 |
| 6,480,320 B2 | 11/2002 | Nasiri | 359/291 |
| 6,491,404 B2 | 12/2002 | Hill | 359/872 |
| 6,495,893 B2 | 12/2002 | Lin et al. | 257/415 |
| 6,529,652 B1 | 3/2003 | Brenner | 385/16 |
| 6,533,947 B2 | 3/2003 | Nasiri et al. | 216/2 |
| 6,535,319 B2 | 3/2003 | Buzzetta et al. | 359/225 |
| 6,538,799 B2 | 3/2003 | McClelland et al. | 359/291 |
| 6,597,828 B2 | 7/2003 | Lee et al. | 385/18 |
| 6,677,695 B2 | 1/2004 | Dhuler et al. | 310/309 |
| 6,690,850 B1 | 2/2004 | Greywall | 385/18 |
| 6,744,173 B2 * | 6/2004 | Behin et al. | 310/309 |
| 6,747,786 B2 | 6/2004 | Murakami et al. | 359/291 |
| 6,760,144 B2 | 7/2004 | Hill et al. | 359/290 |
| 6,778,728 B2 | 8/2004 | Taylor et al. | 385/18 |
| 6,781,744 B1 | 8/2004 | Aksyuk et al. | 359/290 |
| 6,822,370 B2 | 11/2004 | Clarke et al. | 310/309 |
| 6,934,439 B2 | 8/2005 | Mala et al. | 385/18 |
| 6,984,917 B2 | 1/2006 | Greywall et al. | 310/310 |
| 2002/0012180 A1 | 1/2002 | Yu et al. | 359/872 |
| 2002/0071169 A1 | 6/2002 | Bowers et al. | 359/291 |
| 2002/0075554 A1 | 6/2002 | Brophy et al. | 359/291 |
| 2002/0126455 A1 | 9/2002 | Wood | 361/728 |
| 2004/0212864 A1 | 10/2004 | Greywall et al. | 359/223 |

FOREIGN PATENT DOCUMENTS

| | | |
|---|---|---|
| EP | 0902538 | 9/1998 |
| EP | 1197779 | 10/2001 |

OTHER PUBLICATIONS

Optical Networking, The Analog Devices Solutions Bulletin, Jan. 2002, Analog devices at OFC 2002, Anaheim, CA, Booth 4975, Mar. 19-21.

Lopez, D., et al., Monolithic MEMS Optical Switch with Amplified Out-of-Plance Angular Motion; IEEE, 2002, pp. 165-166.

Kehr, Kersten, et al., "Analogously Working Micromirror Arrays", Part of the SPIE Conference on Miniaturized Systems with Micro-Optics and MEMS, Santa Clara, Sep. 1999, SPIE vol. 3878, pp. 80-89.

Giles, C.R., et al., "A Silicon MEMS Optical Switch Attenuator and Its Use in Lightwave Subsystems", IEEE Journal of Selected Topics in Quantum Electronics, vol. 5, No. 1, Jan./Feb. 1999, pp. 18-25.

Johanna I. Young, et al., "Comparative Study of 2-DOF Micromirrors for Precision Light Manipulation Spie Smart Structures and Materials Conference", Newport Beach, CA, Mar. 4-7, 2001.

Velijko Milanovic, et al., Monolithic High Aspect Ratio Tw-Axis Optical Scanners in SOI; 2003 Mems Conference, Kyoto, Japan, Jan. 19-23, 2003, pp. 255-258.

Sunghoon Kwon, et al., "Large-Displacement Vertical Microlens Scanner with Low Driving Voltage", IEEE Photonics Technology Letters, vol. 14, No. 11, Nov. 2002, pp. 1572-1574.

Horsley et al., "Multi-Degree of Freedom Dynamic Characterization of Deep-Etched Silicon Suspension", Solid State and Actuator Workshop, Hilton Head, Jun. 4-8, 2000, pp. 81-84.

B.M. Evans et al., "Finite elements Modeling of Micromachined Mens Photon Devices", Miniaturized Systems with Micro-optics and MEMIS, Santa Clara, Sep. 1999, SPIE 3878, pp. 253-260.

David Burns, et al., "Optical Bea, Steering Using Surface Micromachined Gratings and optical Phased Arrays", Optical Scanning Systems, Design and Applciation, SanDiego, CA, Jul. 1998, SPIE 3131, pp. 99-110.

* cited by examiner

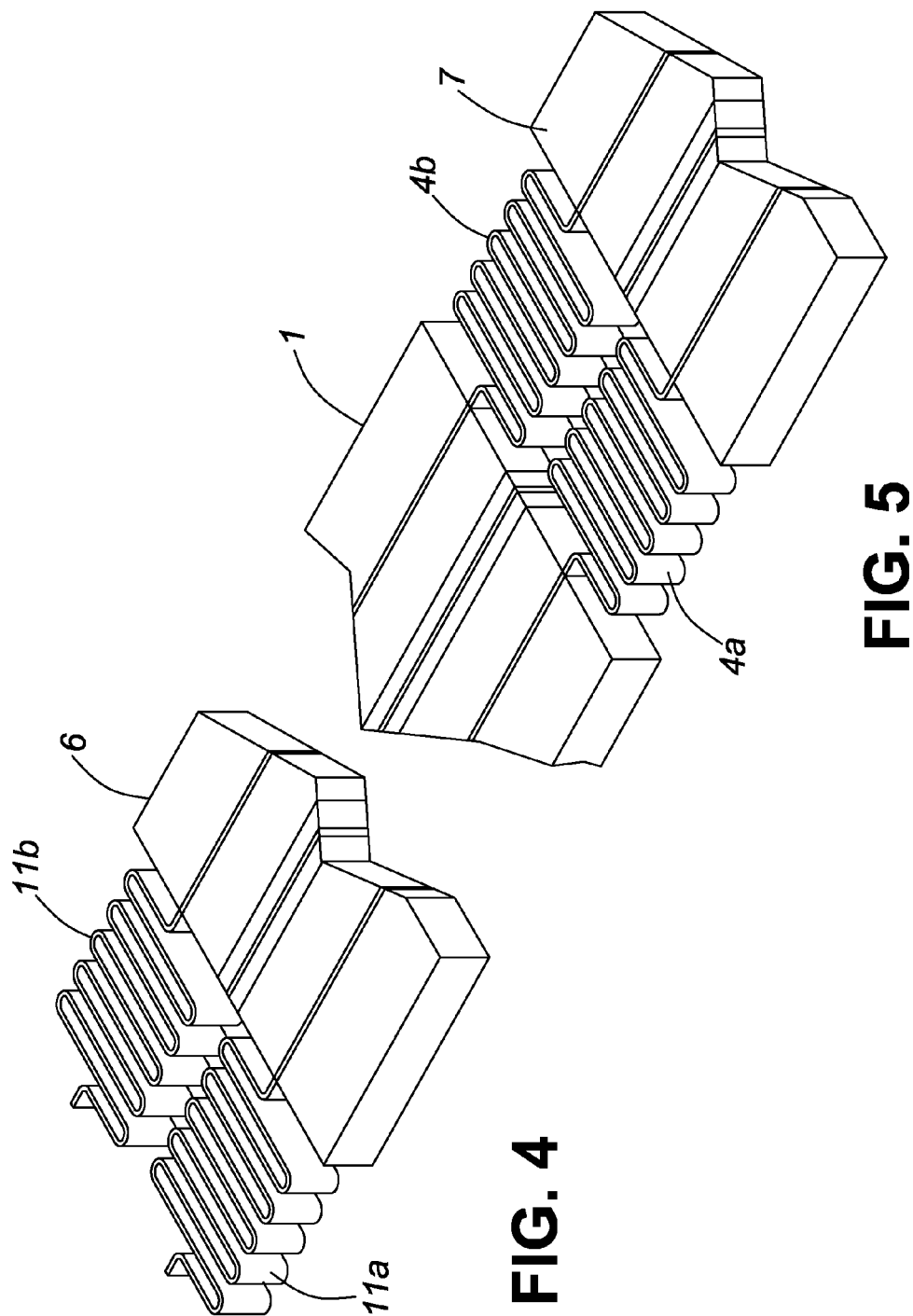

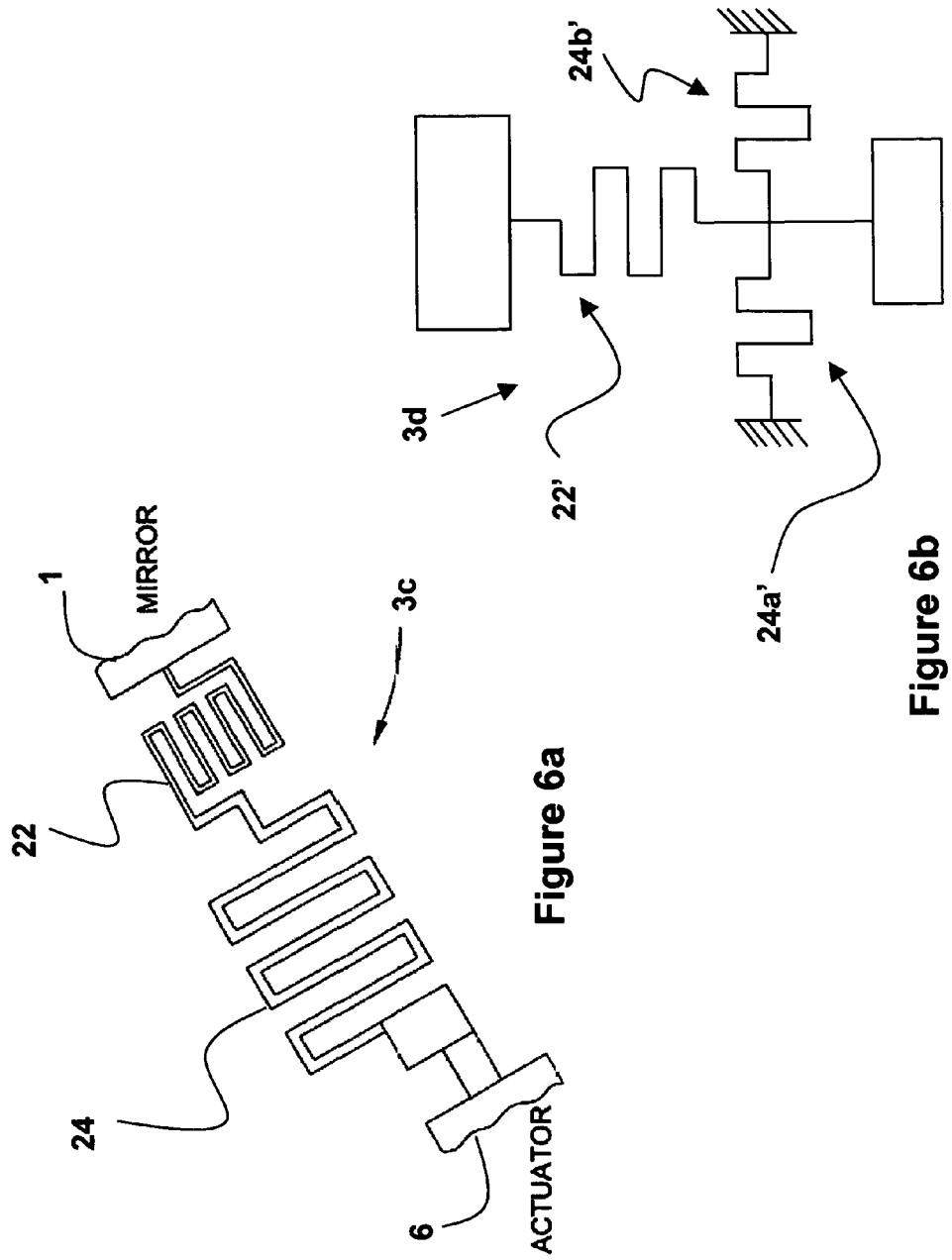
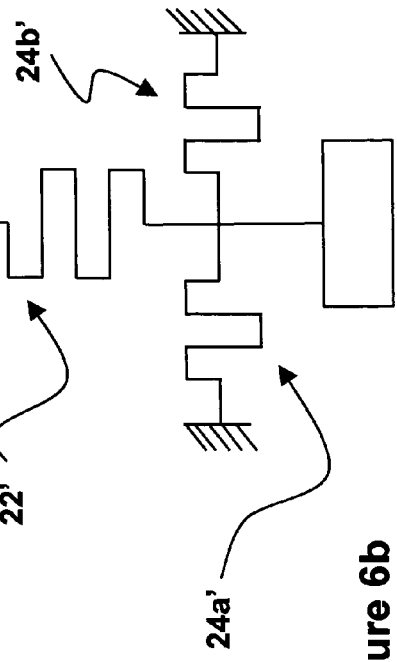
Figure 6a
Figure 6b

ARTICULATED MEMS STRUCTURES

CROSS-REFERENCE TO RELATED APPLICATIONS

The present invention claims priority from U.S. patent application Ser. No. 60/653,086 filed Feb. 16, 2005, which is incorporated herein by reference.

TECHNICAL FIELD

The present invention relates to an articulated micro-electro-mechanical (MEMS), and in particular to an articulated MEMS structure for tilting a reflective surface about two perpendicular axes.

BACKGROUND OF THE INVENTION

Conventional MEMs mirrors for use in optical switches, such as the one disclosed in U.S. Pat. No. 6,535,319 issued Mar. 18, 2003 to Buzzetta et al, redirect beams of light to one of a plurality of output ports, and include an electrostatically controlled mirror pivotable about a single axis. Tilting MEMs mirrors, such as the ones disclosed in U.S. Pat. Nos. 6,491,404 issued Dec. 10, 2002 in the name of Edward Hill, and 6,677,695 issued Jan. 13, 2004 in the name of Dhuler et al, which are incorporated herein by reference, comprise a mirror pivotable about a central longitudinal axis. The MEMs mirror device 101, disclosed in the aforementioned Hill patent, is illustrated in FIG. 1, and includes a rectangular planar surface 102 pivotally mounted by torsional hinges 104 and 105 to anchor posts 107 and 108, respectively, above a substrate 109. The torsional hinges may take the form of serpentine hinges, which are disclosed in U.S. Pat. No. 6,327,855 issued Dec. 11, 2001 in the name of Hill et al, and in United States Patent Publication No. 2002/0126455 published Sep. 12, 2002 in the name of Robert Wood, which are incorporated herein by reference. In order to position conventional MEMs mirror devices in close proximity, i.e. with a high fill factor (fill factor=width/pitch), they must be positioned with their axes of rotation parallel to each other. Unfortunately, this mirror construction restraint greatly restricts other design choices that have to be made in building the overall switch.

When using a conventional MEMs arrangement, the mirror 101 positioned on the planar surface 102 can be rotated through positive and negative angles, e.g. ±2°, by attracting one side 110a or the other side 110b of the planar surface 102 towards the substrate 109. Unfortunately, when the device is switched between ports at the extremes of the devices rotational path, the intermediate ports receive light for fractions of a millisecond as the mirror 1 sweeps the optical beam past these ports, thereby causing undesirable optical transient or dynamic cross-talk.

Articulated MEMs devices, such as those disclosed in U.S. Pat. Nos. 6,495,893 issued Dec. 17, 2002 to Lin et al; 6,760,144 issued Jul. 6, 2004 to Hill et al; and 6,822,370 issued Nov. 23, 2004 to Clark et al, can provide high fill factors, and magnified angular ranges, but do not solve the problem of dynamic cross-talk because of laterally extending fixed hinges, which prevent rotation about two axes. Another advantage of articulated MEMs devices is the separation of actuating electrodes from the mirrored platforms.

One solution to the problem of dynamic cross-talk is to initially or simultaneously rotate the mirror about a second axis, thereby avoiding the intermediate ports. An example of a MEMs mirror device pivotable about two axes is illustrated in FIG. 2, and includes a mirror platform 111 pivotally mounted by a first pair of torsion springs 112 and 113 to an external gimbal ring 114, which is in turn pivotally mounted to a substrate 116 by a second pair of torsion springs 117 and 118. Examples of external gimbal devices are disclosed in U.S. Pat. Nos. 6,529,652 issued Mar. 4, 2003 to Brenner, and 6,454,421 issued Sep. 24, 2002 to Yu et al. Unfortunately, an external gimbal ring greatly limits the number of mirrors that can be arranged in a given area and the relative proximity thereof, i.e. the fill factor. Moreover, the external gimbal ring may cause unwanted reflections from light reflecting off the support frame 113, 114.

Another proposed solution to the problem uses high fill factor mirrors, such as the ones disclosed in U.S. Pat. No. 6,533,947 issued Mar. 18, 2003 to Nasiri et al, which include hinges hidden beneath the mirror platform. Unfortunately, these types of mirror devices require costly multi-step fabrication processes, which increase costs and result in low yields.

Yet another solution to overcome the shortcomings of the prior art is disclosed in U.S. Pat. No. 6,934,439 issued Aug. 23, 2005 to Mala et al (incorporated herein by reference), which provides a high fill factor MEMs mirror device that pivots about the same axis as an adjacent mirror and includes an internal gimbal ring for rotating about perpendicular axes.

An object of the present invention is to overcome the shortcomings of the prior art by providing a MEMs device providing an articulated MEMs device with a high fill factor and extended tilt range, which is tiltable about perpendicular axes.

SUMMARY OF THE INVENTION

Accordingly, the present invention relates to an articulated micro-electro-mechanical device suspended above a substrate comprising:

a main platform having a longitudinal axis pivotable about first and second perpendicular axes;

a first moveable actuator, one end of which is pivotally connected to the main platform, for pivoting the main platform about the first axis;

a first actuating means for moving the first moveable actuator, thereby pivoting the main platform about the first axis; and a second actuating means for pivoting the main platform about the second axis.

BRIEF DESCRIPTION OF THE DRAWINGS

The invention will be described in greater detail with reference to the accompanying drawings which represent preferred embodiments thereof, wherein:

FIG. 4 is an isometric view of serpentine torsional hinges on the device of FIG. 3;

FIG. 5 is an isometric view of a double serpentine torsional hinge on the device of FIG. 3;

FIG. 6a is a top view of a serpentine torsional hinge having folds extending in perpendicular directions;

FIG. 6b is a top view of a serpentine torsional hinge having folds extending in perpendicular directions;

DETAILED DESCRIPTION

Figure 1:
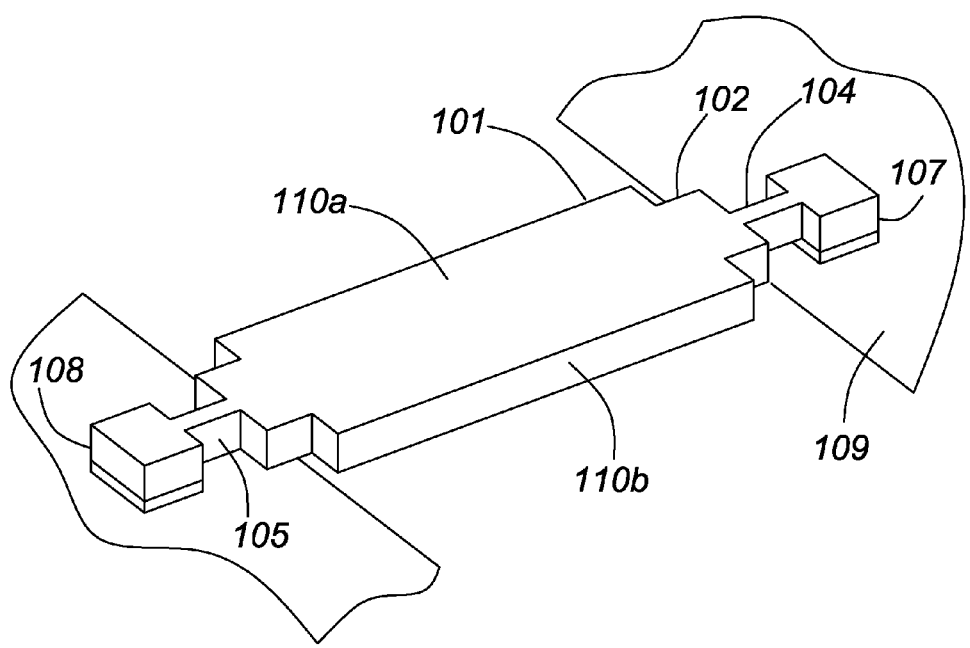
FIG. 1 is an isometric view of a conventional tilting MEMs mirror device.
Figure 2:
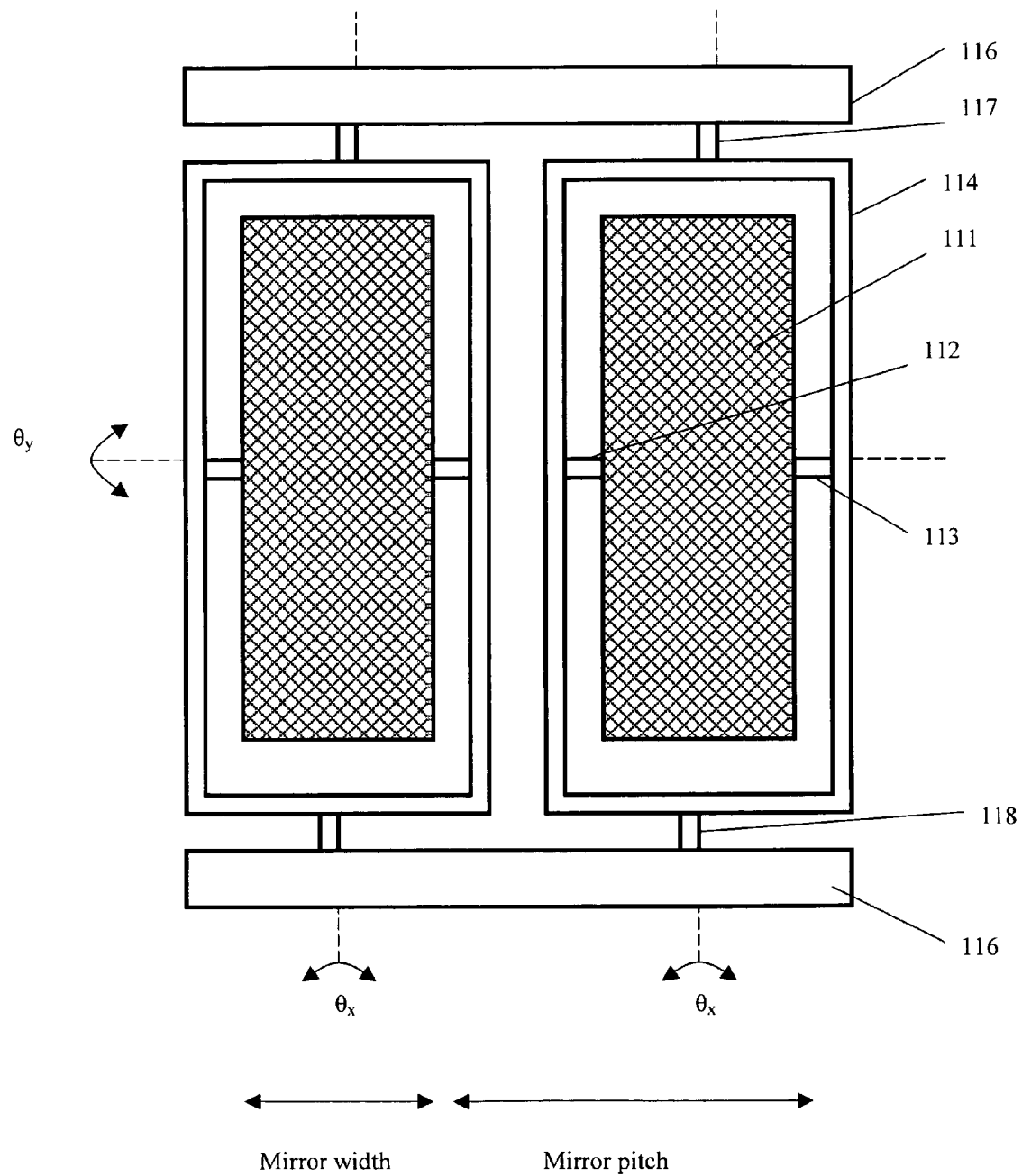
FIG. 2 is a plan view of a pair of conventional external gimbal ring MEMs mirror devices.
Figure 3:
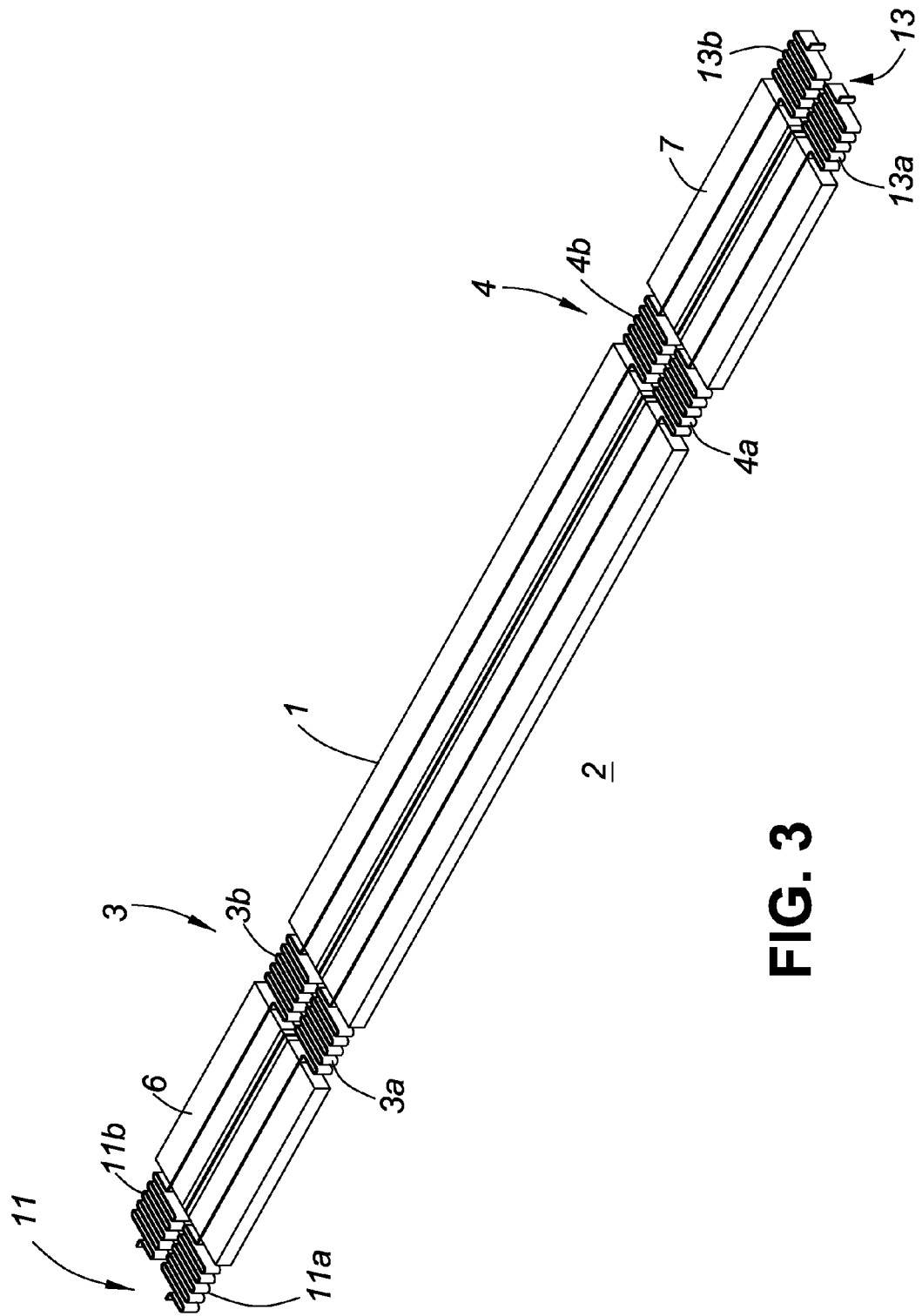
FIG. 3 is an isometric view of an articulated MEMs device according to the present invention in a rest position.

With reference to FIGS. 3 to 9, a first embodiment of an articulated MEMs device according to the present invention comprises a main pivoting body, in the form of a rectangular platform 1, (although other shapes are possible) pivotable about a first (primary, Z or tilt) axis and a second (secondary, X or roll) axis, perpendicular to the first, above a substrate 2. Typically, the platform 1 is coated with a highly reflective material, e.g. gold, forming a mirror for reflecting incident beams of light at various output angles. Ligatures enabling the platform 1 to rotate about axes in two dimensions are provided in the form of first and second torsional hinges 3 and 4 extending from opposite ends of the platform 1 into contact with first and second pivoting actuators 6 and 7, respectively. In a first embodiment, each of the first and second torsional hinges comprises a pair of serpentine (or articulated) resilient torsional beams 3a, 3b, 4a and 4b, one on each side of the longitudinal axis (X-axis) of the main platform 1. The ends of the beams 3a and 3b are fixed to the platform 1 and the first actuator 6 along lines parallel to the longitudinal axis of the platform 1. Similarly, the ends of the beams 4a and 4b are fixed to the platform 1 and the second actuator 7 along lines parallel to the longitudinal axis of the platform 1, so that the platform 1 is free to rotate (or roll) about its longitudinal axis (X-axis) and tilt about its central transverse axis (Z-axis). In the illustrated embodiment the beams 3a, 3b, 4a and 4b are folded such that the folds, i.e. the long bar portions, run perpendicular to the longitudinal axis of the platform 1 (Z-dimension), and perpendicular to a line joining the ends thereof, however, providing the hinges 3a, 3b, 4a and 4b with folds running in the perpendicular direction, i.e. perpendicular to the longitudinal axis of the platform 1 (X-dimension), or with folds running in both directions (two dimensions X and Z), as in FIGS. 6a and 6b, is possible depending upon the relative spring constant requirements of the hinges, as will be discussed below. In the illustrated embodiment, the ends of the beam 3a are collinear with the ends of the beam 4a, and the ends of the beam 3b are collinear with the ends of the beam 4b. The serpentine hinge with a plurality of folds is effectively longer than a normal torsional hinge, which spans the same distance, thereby providing greater deflection and strength, without requiring the space that would be needed to extend a normal full-length torsional hinge. Each beam making up the serpentine (or articulated) hinge has a height (or thickness), e.g. 10 to 20 μm, much larger than width, e.g. 1.0 to 2.0 μm, defining a large aspect ratio, e.g. 5 to 20, (thickness/width), which provides the necessary flexibility.

The first actuator 6 is in the form of a rectangular rotating platform, although other shapes are possible, and is pivotally mounted to an anchor support 9 extending from the substrate 2 by another ligature in the form of a third torsional hinge 11. In the illustrated embodiment, the third torsional hinge 11, like the first and second torsional hinges 3 and 4, is comprised of a pair of serpentine compliant beams 11a and 11b, one on each side of the longitudinal axis of the first actuator 6. The second actuator 7 is in the form of a rotating platform, e.g. rectangular, and is pivotally mounted to an anchor support 12 extending from the substrate 2 by a fourth torsional hinge 13. In the illustrated embodiment, the fourth torsional hinge 13, like the first and second torsional hinges 3 and 4, is comprised of a pair of serpentine compliant beams 13a and 13b, one on each side of the longitudinal axis of the second actuator 7. The beams 11a, 11b, 13a and 13b are folded such that the folds run perpendicular to the longitudinal axis of the platform 1, and perpendicular to a line joining the ends thereof (one dimension); however, providing the hinges 11a, 11b, 13a and 13b with folds running in the perpendicular direction, i.e. perpendicular to the longitudinal axis of the platform 1, or with folds running in both directions (two dimensions), as in FIG. 6, is possible depending upon the relative spring constant requirements of the hinges, as will be discussed below. In this embodiment, the ends of the beams 11a and 11b are collinear with the ends of the beam 3a and 3b, respectively, and the ends of the beams 13a and 13b are collinear with the ends of the beams 4a and 4b, respectively.

A compound hinge 3c illustrated in FIG. 6a, previously disclosed in U.S. Pat. No. 6,760,144, can be adapted to extend between the main platform 1 and the first actuator 6, and includes a first serpentine torsional hinge 22 fixed along the longitudinal X axis with folds running in one direction parallel to the longitudinal X axis, and a second serpentine torsional hinge 24 fixed perpendicular to the longitudinal X axis with folds running in a second direction, perpendicular to the longitudinal X axis providing better control over the spring constants in both the X and Z dimensions. The thinner folds 22 facilitate the pivoting of the main platform 1 about the rolling axis (X axis), while the thicker folds 24 facilitate the pivoting of the main platform 1 about the tilting axis (Z axis). The second torsional hinge 4 can have folds running in either direction or both directions.

Similarly, with reference to FIG. 6b, a multi-dimensional hinge 3d includes three single dimensional torsional serpentine (or articulated) hinges. A first hinge 22' has one end extending from a point on either the actuator 6 or the main platform 1. Second and third hinges 24a' and 24b' have outer ends fixed to points on supports extending from the substrate 2, and extend from opposite sides of the first hinge 22' into contact with each other and the end of the first hinge 22'. As above, the first hinge 22' facilitates roll about the longitudinal X axis, while the second and third hinges facilitate tilting about the Z axes.

Figure 7A:
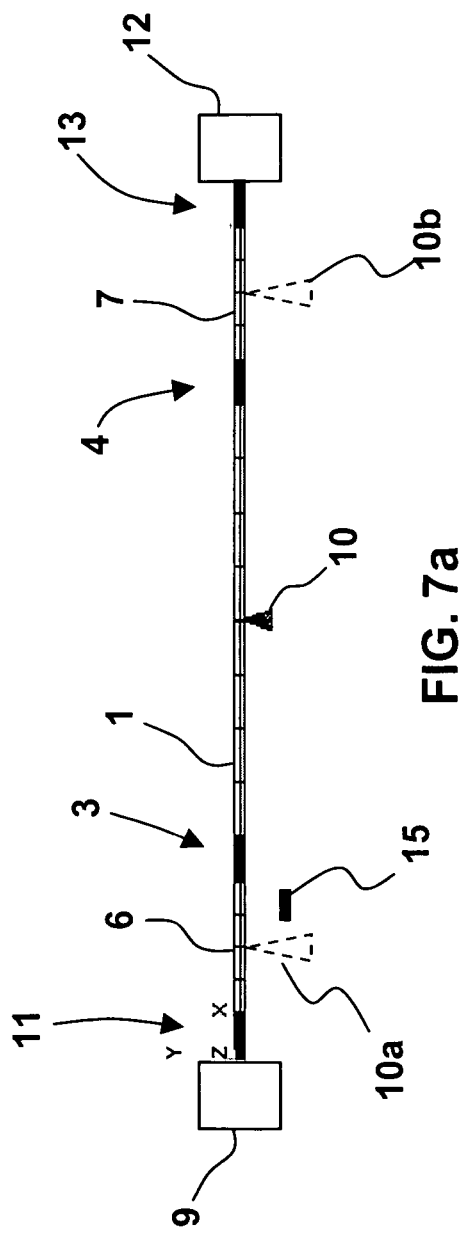
FIG. 7a is a side view of the device of FIG. 3 in the rest position.
Figure 7B:
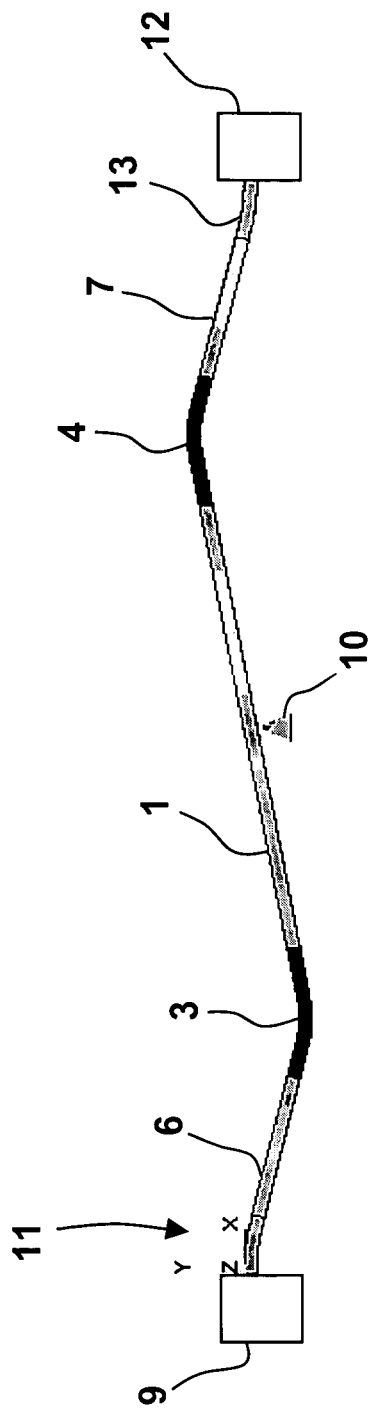
FIG. 7b is a side view of the device of FIG. 3 in the deflected position.
Figure 8:
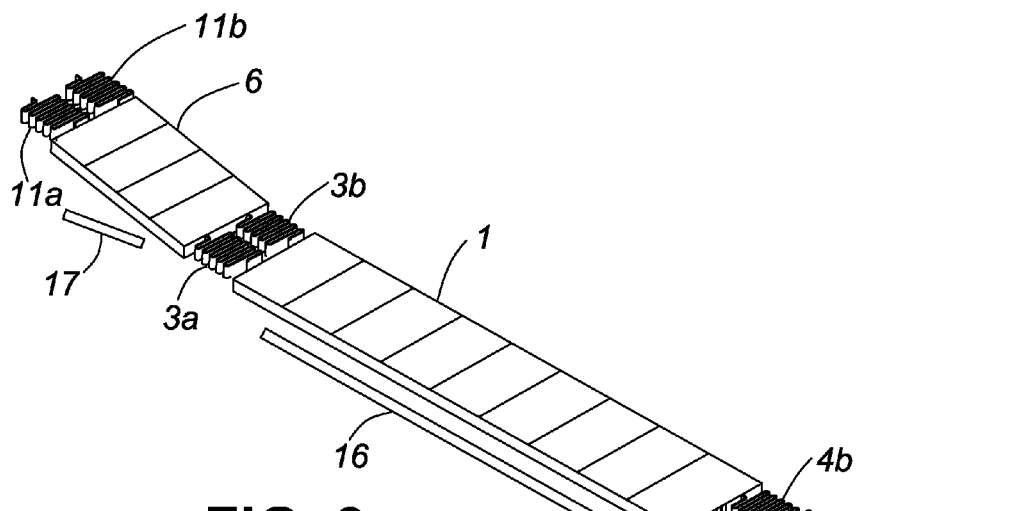
FIG. 8 is an isometric view of the device of FIG. 3 in a deflected position about the Z-axis.

FIG. 7a illustrates the MEMS device in a rest position, in which the main platform 1, and the first and second actuators are all coplanar. To rotate, i.e. tilt, the main platform 1 in a counterclockwise direction about fulcrum point 10, the first actuator 6 is rotated in the opposite direction, i.e. clockwise, about the third torsional hinge 11, by actuation of an electrostatic electrode 15 or some other form of attracting/repulsing means disposed above or beneath the free end of the first actuator 6 proximate the first torsional hinge 3, which attracts or repulses the free end of the first actuator 6 towards or away therefrom. Typically, the fulcrum point 10 is a post extending from the substrate 2 pivotally contacted to the main platform 1 proximate the intersection of the longitudinal and lateral axes providing a pivoting point for the main platform 1 when pivoting about both axes. To enable the main platform 1 to rotate about the fulcrum point 10, the second actuator 7 is rotated in the opposite direction, i.e. clockwise. The second actuator 7 can be a slave actuator for stabilizing the end of the main platform 1 or a second electrode can be placed above or below the second actuator 7 for rotation thereof. Accordingly, the acute angle of rotation, e.g. from 0° to 6°, of the main platform 1 about the central transverse (Z or tilt) axis is adjusted by controlling the amount of voltage applied to the electrode(s) beneath the first and/or the second actuators 6 and 7.

Alternatively, the first and second actuators 6 and 7 can be provided with fixed pivot points 10a and 10b, e.g. fulcrums, shown in outline in FIG. 7a, and the main platform 1 can be unattached, thereby pivoting about a phantom hinge point. With this arrangement, the tilt angle of the main platform 1 can be controlled by both the first and second actuators 6 and 7, e.g. by electrodes therebeneath, thereby increasing, e.g. up to doubling, the range over which the main platform 1 can be rotated. The maximum tilt angle will be dictated by the maximum displacement, i.e. the gap, between the main platform 1 and the substrate 2, and the relative lengths of the main platform 1 and the first and second actuators 6 and 7. In alternative embodiments the first and second actuators 6 and 7 have longer lengths than the main platform 1, whereby a small tilt angle on the first actuator 6 results in a larger tilt angle on the main platform for the same displacement.

Figure 9:
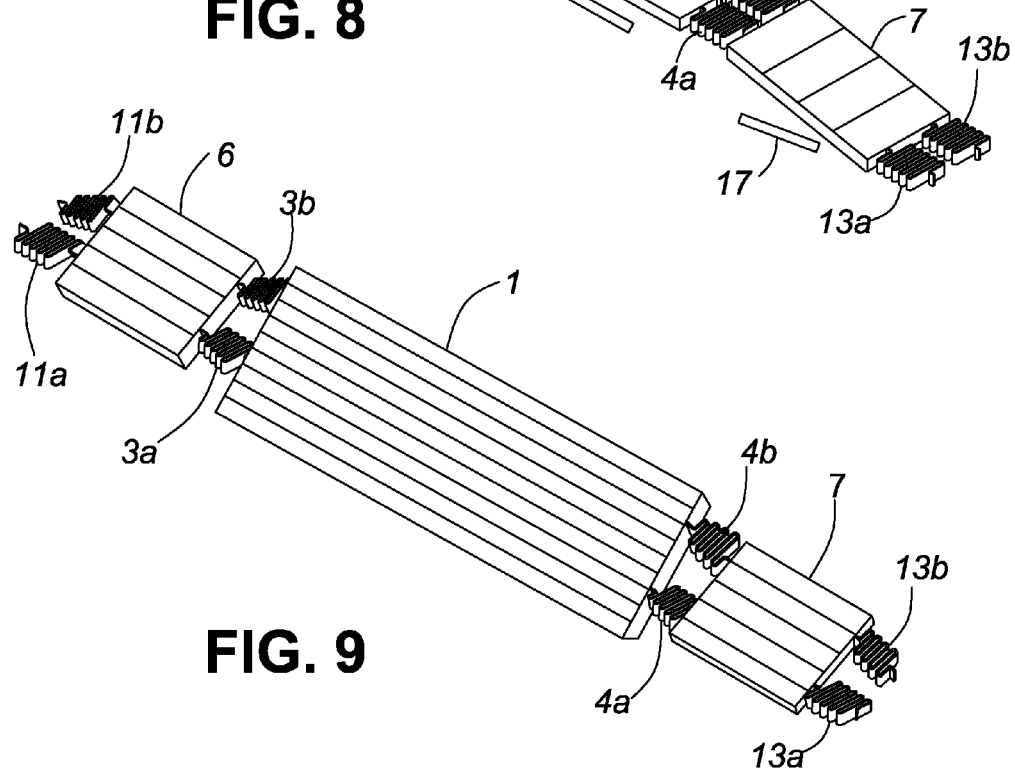
FIG. 9 is an isometric view of the device of FIG. 3 rotated about the X-axis.

With reference to FIG. 9, one way to rotate (or roll) the main platform 1 about an X-axis, e.g. about its longitudinal axis, is to actuate an electrostatic electrode 16 or some other form of attracting/repulsing means above or beneath one side of the main platform 1, i.e. beneath the section of the main platform 1 on one side of the longitudinal axis thereof, to attract or repulse the one side of the main platform 1 thereto or therefrom. Typically only 2° to 6° of roll are required, although higher angles are possible, depending on the gap between the platform and the substrate. As illustrated in FIG. 9, the spring constants of the first and second torsional hinges 3 and 4 are less than those of the third and fourth torsional hinges 11 and 13, whereby the main platform 1 will rotate (or roll) about its longitudinal axis, while the first and second actuators 6 and 7 will not roll or will roll less than the main platform 1. As illustrated in FIG. 9, the main platform 1 includes several longitudinally extending lines corresponding to a relatively large roll angle, while the first and second actuators 6 and 7 only have one longitudinally extending line corresponding to a relatively small roll angle. The longitudinal lines are contours representing vertical deflection of the platform surfaces, the closer the spacing of the contours, the steeper the angle. The direction of the contours indicates the tilt axis, i.e. the contours are parallel to the tilt axis. Reducing the spring constants of the first and second torsional hinges 3 and 4 can be done by replacing the pairs of serpentine beams 3a, 3b and 4a, 4b with a single serpentine beam, and/or by adjusting the shape of the serpentine beams, e.g. by reducing the thickness of the beam, by increasing the length of the beam, by increasing the number of folds in each beam, by reducing the height of each beam, by choosing a more flexible material for each beam. Alternatively or in addition thereto, electrodes 17 can be actuated beneath one side of each of the first and second actuators 6 and 7, i.e. beneath the section of the first and second actuators on one side of the longitudinal axis thereof to rotate the main platform 1 and both actuators 6 and 7 together, as will be discussed with reference to FIGS. 10 to 12. A restoring force can be provided by additional electrodes beneath the opposite side of the main platform 1 and/or the first and second actuators 6 and 7 to better control the motion of the main platform 1. Alternatively, the spring force provided by the torsional hinges can restore the main platform 1 back to the rest position.

Figure 10:
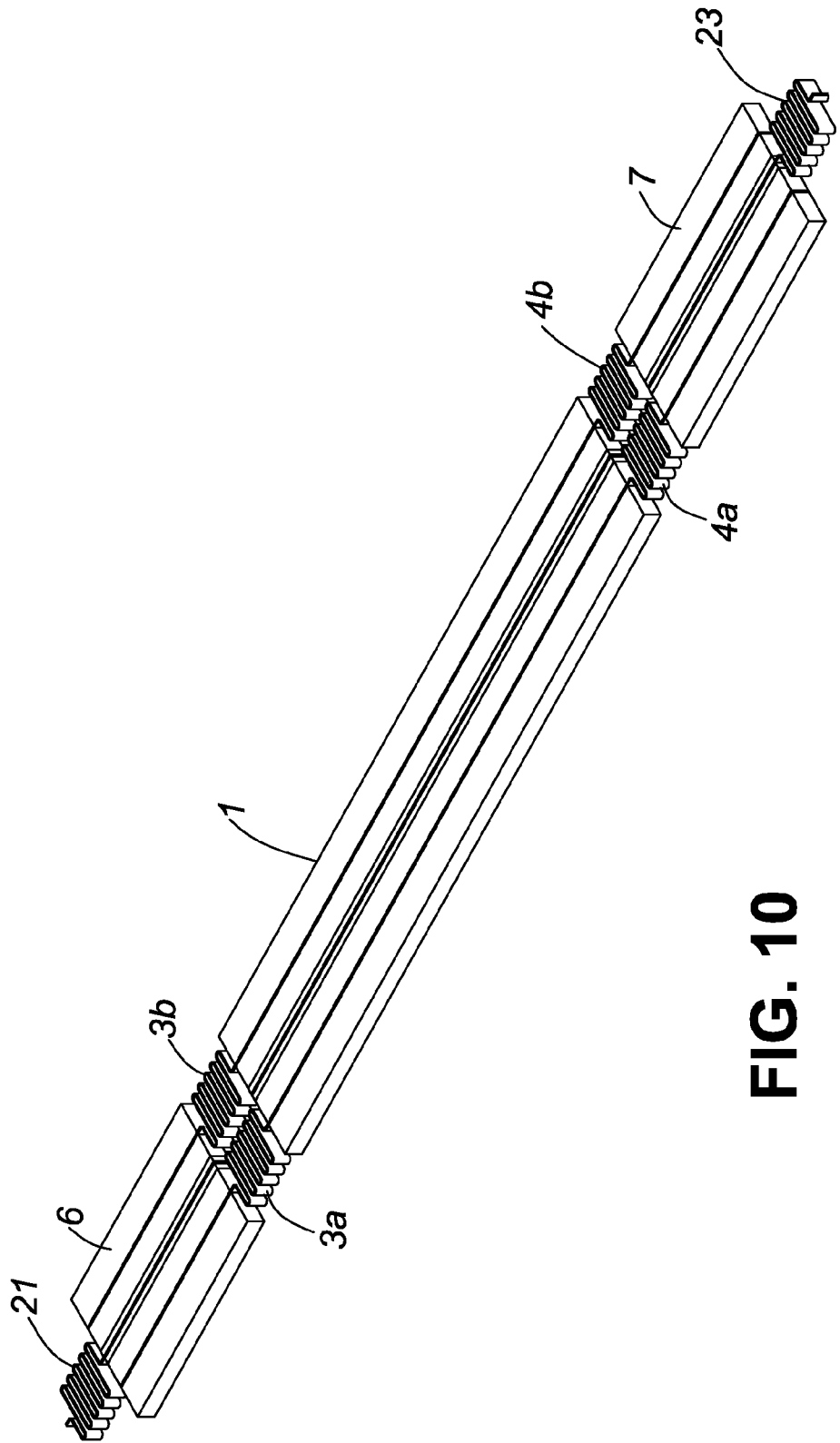
FIG. 10 is an isometric view of an articulated MEMs device according to an alternative embodiment of the present invention.
Figure 11:
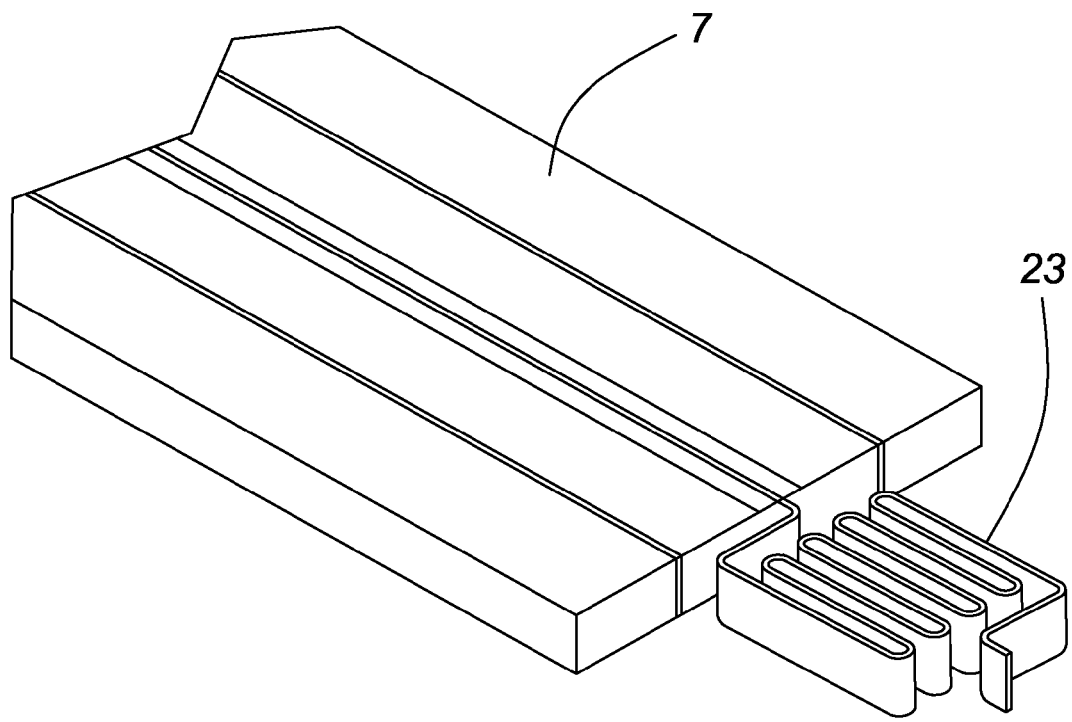
FIG. 11 is an isometric view of a single serpentine torsional hinge on one end of the device of FIG. 10.
Figure 12:
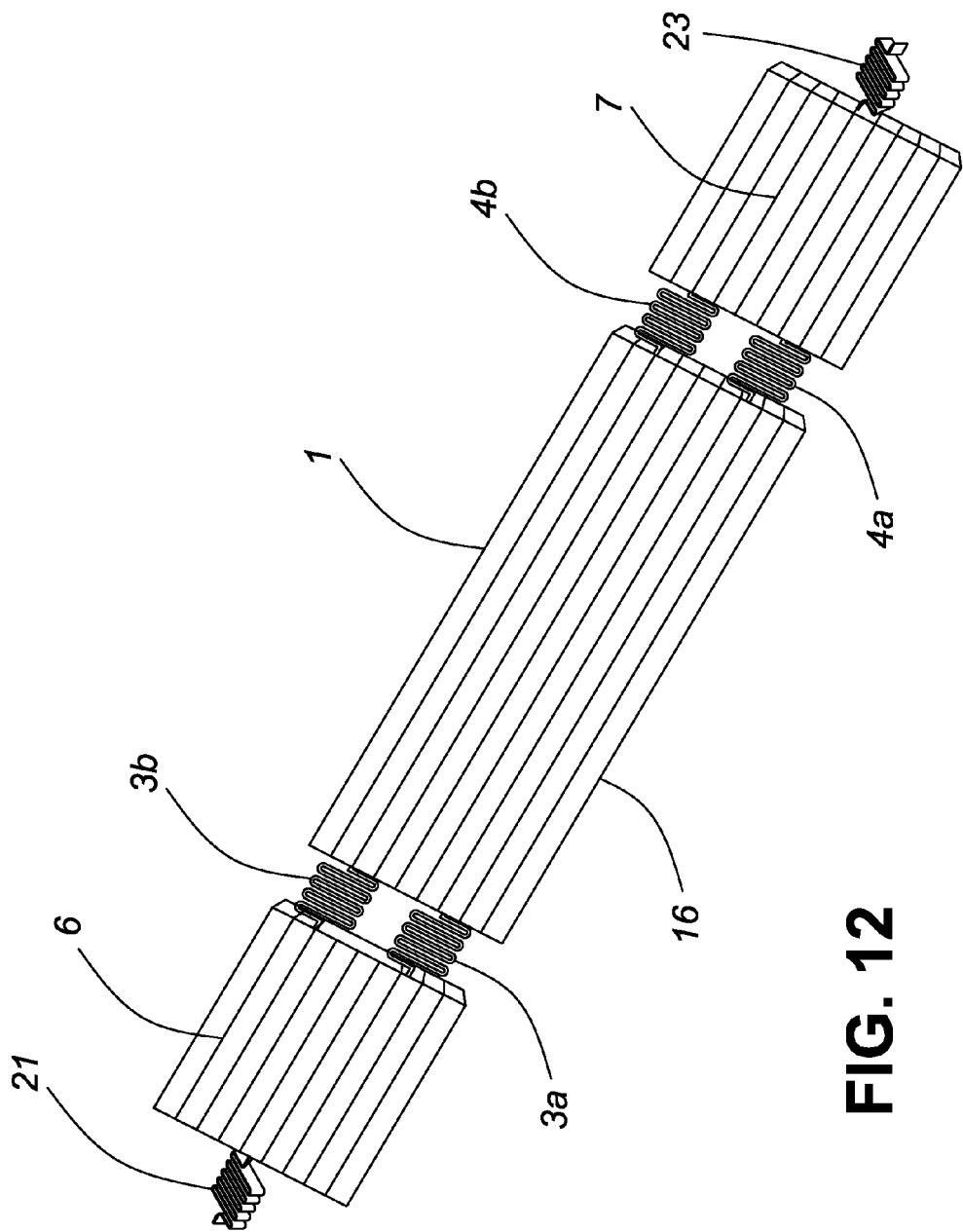
FIG. 12 is an isometric view of the device of FIG. 10 rotated about the X-axis.

In an alternative embodiment, illustrated in FIGS. 10 to 12, the third torsional hinge 11 and the fourth torsional hinge 13 are each formed by a single serpentine compliant beam 21 and 23, respectively, with the ends thereof collinear with the longitudinal axes of the first and second actuators 6 and 7 and the main platform 1. The beams 21 and 23 are folded such that the folds run parallel to the longitudinal axis of the platform 1, and parallel to a line joining the ends thereof, thereby making the beams 21 and 23 more compliant, i.e. reduced spring constant, to roll about the longitudinal X axis relative to the Z axis.

As above, the main platform 1 can be rotated about its longitudinal axis by either actuating an electrode 16 beneath one side of the main platform 1 and/or by actuating electrodes beneath the first and second actuators 6 and 7. The single serpentine compliant beam 21 and 23 with spring constants in the roll direction lower than the first and second torsional hinges 3 and 4, enable the main platform 1 and the first and second actuators 6 and 7 to rotate simultaneously much easier than the double beam hinges 11 and 13. As illustrated in FIG. 12, the first and second actuators 6 and 7 include as many longitudinally extending lines as the main platform 1. Preferably a single electrode 16 is used to roll the main platform 1, and a single electrode 15 beneath one or both of the first and second actuators 6 and 7 is used to pivot the main platform 1, whereby the two electrodes 15 and 16 can be easily isolated from each other, thereby eliminating any interference therebetween. Moreover, separating the two electrodes 15 and 16 decouples their relationship during the design and manufacturing processes.

Figure 13:
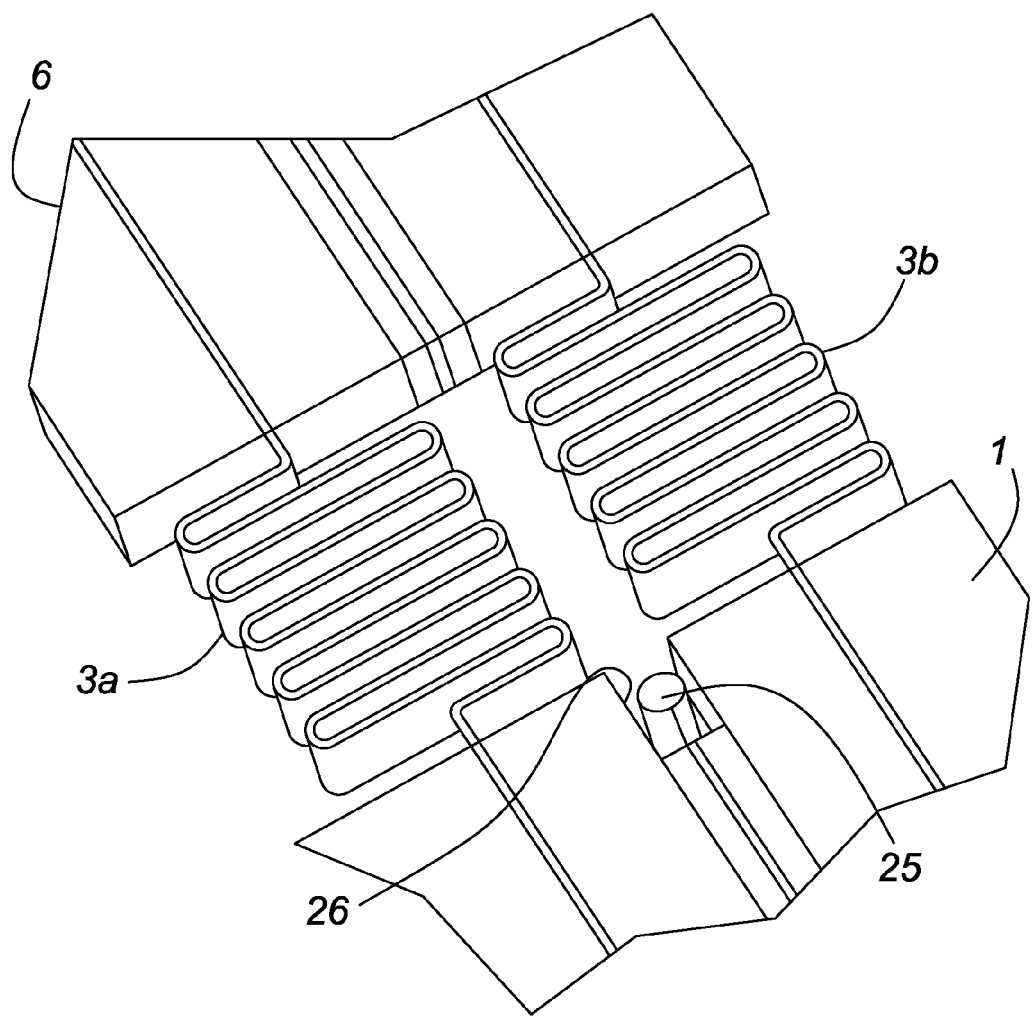
FIG. 13 is an isometric view of the hinge of FIG. 10 with a motion restrictor.

In order to restrict the motion in the lateral and longitudinal directions, i.e. X and Z directions, of the main platform 1 during normal use, and particular during shock, a motion restrictor can be provided. Ideally the motion restrictor is in the form of one or more posts 25, e.g. cylindrical, which extends upwardly from the substrate 2 into an opening or notch 26 formed in the main platform 1, thereby preventing the main platform 1 from moving beyond the normal range of motion from side to side or in the direction of the longitudinal axis (see FIG. 13).

Figure 14:
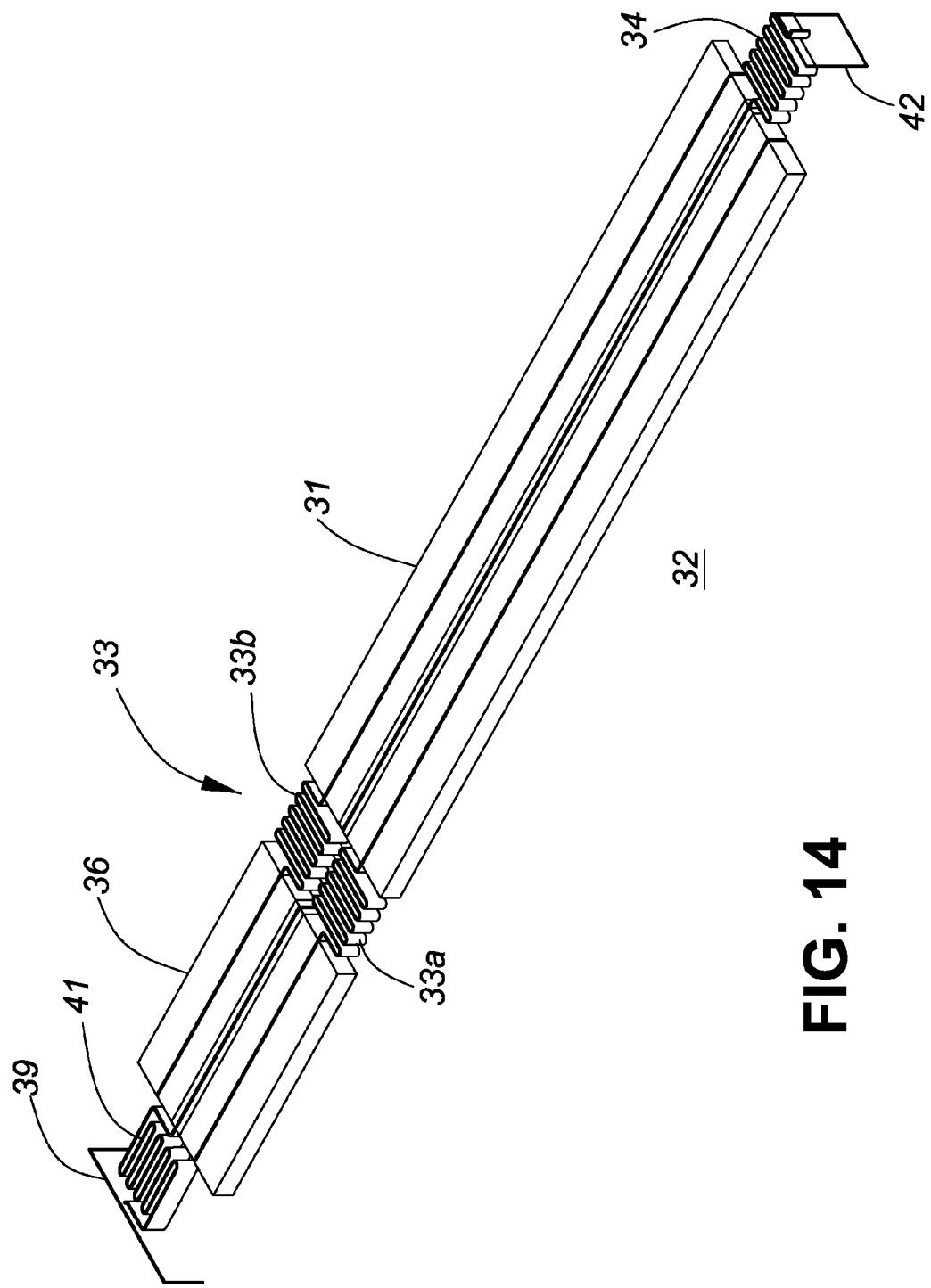
FIG. 14 is an isometric view of an articulated MEMs device according to another embodiment of the present invention.
Figure 15:
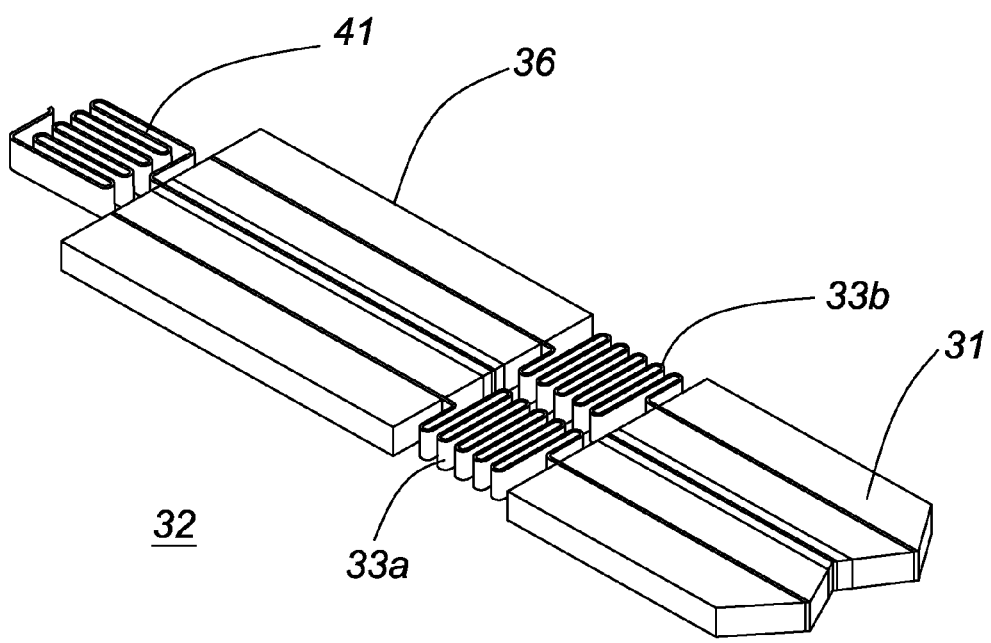
FIG. 15 is an isometric view of an end of the device of FIG. 14 with a single actuator.
Figure 16:
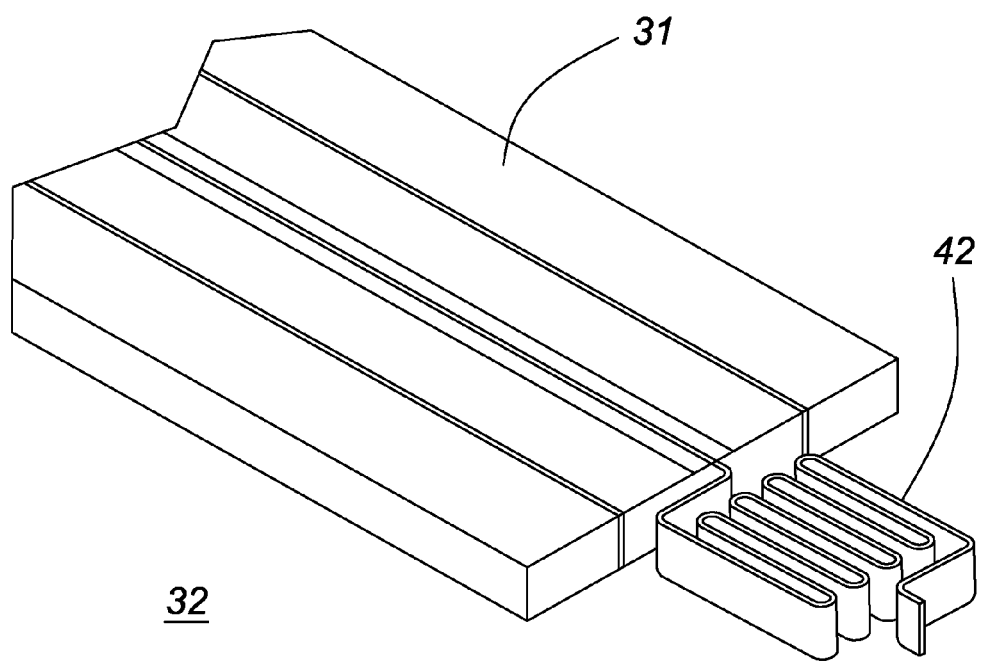
FIG. 16 is an isometric view of the other end of the device of FIG. 14.

Another embodiment of the present invention having a simpler construction, but providing a more limited amount of angular rotation to a main platform 31, is illustrated in FIGS. 14 to 16. The main platform 31 is pivotally mounted above a substrate 32 by a first torsional hinge 33 extending from one end thereof and a second torsional hinge 34 extending from an opposite end thereof. One end of a single pivoting actuator or cantilever 36 is pivotally connected to an end of the first torsional hinge 33, while the opposite end of the pivoting actuator 36 is pivotally connected to a first anchor 39 by a third torsional hinge 41. The second torsional hinge 34 is connected to a second anchor 42. In the illustrated embodiment, the first torsional hinge 33 comprises a pair of parallel serpentine compliant beams 33a and 33b, one on each side of the longitudinal axis of the main platform 31 to partially resist rolling about the longitudinal X axis, while facilitating tilting of the main platform 31 about a lateral Z axis. The folds in the pair of compliant beams 33a and 33b run perpendicular to the longitudinal X axis providing a relatively large spring constant against rotation about the X axis, i.e. roll. Accordingly, the first torsional hinge 33 is substantially a one dimensional hinge enabling the main platform 1 to pivot about a lateral Z axis, while resisting roll about the longitudinal X axis due to a relatively high spring constant against roll.

Each of the second and third torsional hinges 34 and 41 comprise a single serpentine compliant beam having ends fixed along the longitudinal axes of the main platform 31 and the actuator 36, respectively. The second and third torsional hinges 34 and 41 include folds extending parallel to the longitudinal X axis providing a relatively small spring constant against rotation about the X axis, while facilitating tilting of the main platform 41 and the single actuator 36 about lateral Z axes. Accordingly, when either the main platform 31 or the single actuator 36 is rotated about the longitudinal X axis by an attraction/repulsion means, e.g. electrodes 16 or 17, they will both roll together. As in the above embodiments, the second and third torsional hinges 34 and 41 can be substituted for by a pair of parallel beams or by one or more beams with folds extending perpendicular to the longitudinal X axis or with folds running both parallel and perpendicular to the longitudinal X axis, as in FIGS. 6a and 6b, as long as the overall spring constant against roll is less than that of the first torsional hinge 33. Accordingly, the second and third torsional hinges 34 and 41 are substantially two dimensional hinges enabling both the main platform 31 and the single actuator 36 to roll together about the longitudinal X axis, and enabling the main platform 31 and the single actuator 36 to pivot about separate, but parallel lateral X axes.

Alternatively, the third torsional hinge 41 can have a higher spring constant against roll than the first and second torsional hinges 33 and 34, i.e. substantially providing one dimensional rotation about only the tilt or lateral Z axis, whereby the main platform 31 will roll about the longitudinal X axis, when actuated by the attraction/repulsion means, e.g. electrode 16, while the single actuator 36 will remain level or only slightly roll, as described above with reference to FIG. 9. As above, the spring constant of the third torsional hinge can be increased by: providing a plurality, e.g. a pair, of parallel serpentine beams, increasing the thickness of the beam relative to the other, by reducing the length of the beam relative to the other, by reducing the number of folds in each beam relative to the other, by increasing the height of each beam relative to the other, by choosing a less flexible material or materials for each beam relative to the other. Therefore, the first and second torsional hinges 33 and 34 facilitate rotation in two dimensions about both the roll and tilt axes.

Pivoting the actuator 36 about a lateral, e.g. Z, axis at the third torsional hinge 41 either in a clockwise or counterclockwise direction causes the main platform 31 to rotate in the opposite direction about the second torsional hinge 34. An electrostatic electrode or some other form of attracting/repulsing means is placed below the outer free end of the actuator 36, proximate the hinge 33, to attract or repulse the end of the actuator 36, thereby rotating the actuator 36 about the third torsional hinge 41. In the illustrated embodiment of FIGS. 14 to 16, a fulcrum point can be eliminated depending on the overall length of the main platform 31 and actuator 36. Alternatively, the fulcrum point can be provided either beneath the main platform 31; however, it is preferable that the fulcrum point is disposed below the single actuator 36 to ensure that the fulcrum does not interfere with the mirrored surface, i.e. extend through the upper surface of the main platform 31, thereby dividing the upper surface in half. Accordingly, the single actuator 36 would have a rigid extensions on both sides of the fulcrum. As above, rotation about the longitudinal (X) axis can be initiated by an electrostatic electrode or some other form of attracting/repulsing means disposed below one side of the longitudinal axis of the main platform 31 and/or by providing an electrostatic electrode or some other form of attracting/repulsing means disposed below one side of the longitudinal axis of the actuator 36.

Figure 17:
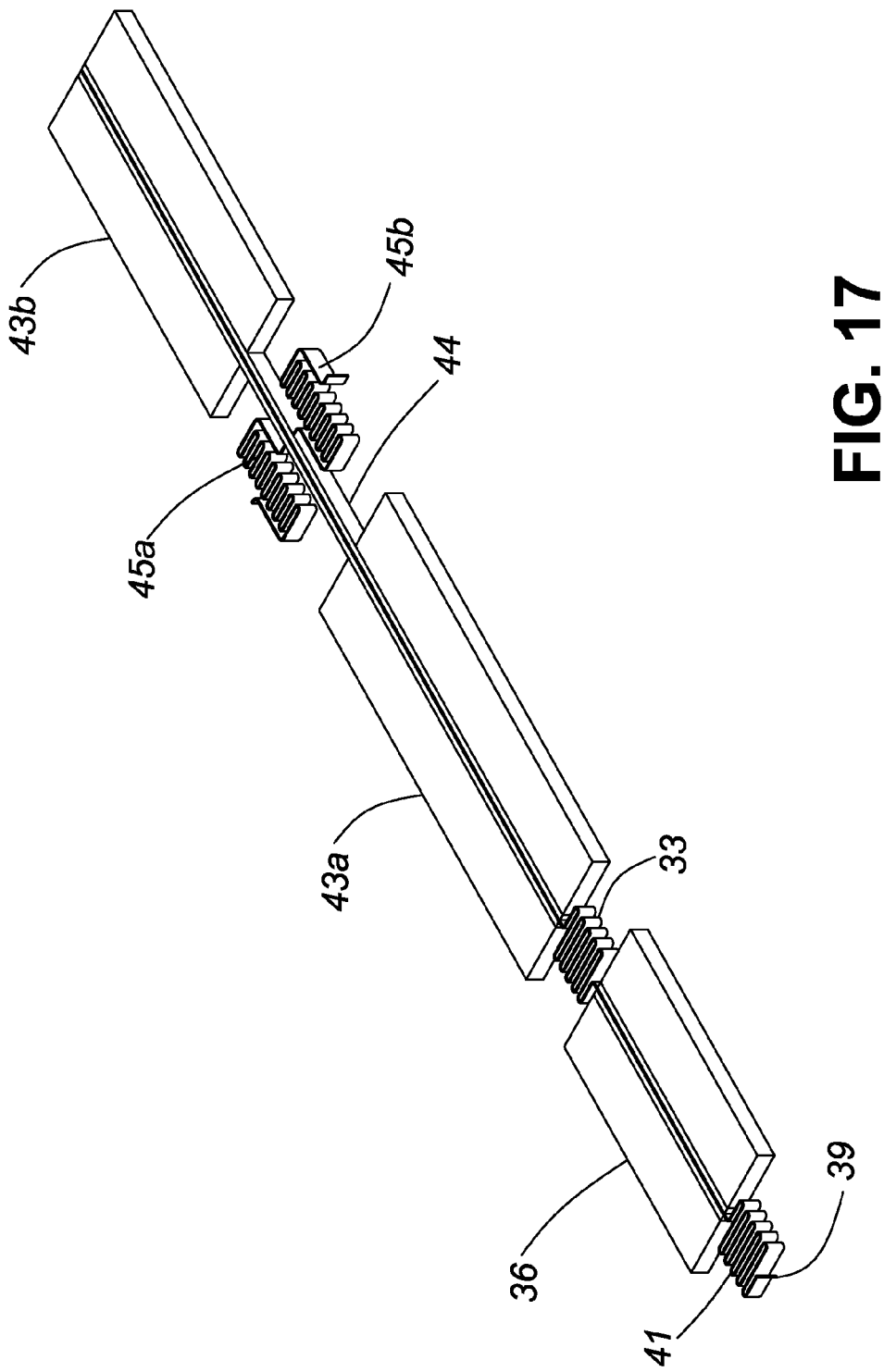
FIG. 17 is an isometric view of an alternative embodiment of the present invention.

In some applications the input beam of light is divided into two sub-beams, and one or both of the polarizations of the sub-beams is rotated, whereby both sub-beams have the same polarization while traveling through the device. Accordingly, in an alternate embodiment illustrated in FIG. 17, the main platform 31 is replaced by a two-part platform including first and second planar sections 43a and 43b, e.g. 200 to 300 μm long, connected by a connecting rod 44, e.g. 100 to 200 μm long, extending therebetween. The second torsional hinge 34 is replaced by an first and second intermediate serpentine torsional hinges 45a and 45, with laterally extending folds, extending from proximate the middle of the connecting rod 44 into contact with anchor posts on each side thereof. The intermediate torsional hinges 45a and 45b have a combined lateral dimension less than the width of the first and second planar sections 43a and 43b, e.g. 80 to 150 μm, to enable the planar sections of adjacent devices to be closely packed, i.e. a high fill factor. The single actuator 36 is pivotally connected to the anchor 39 via the third torsional hinge 41 and to the first planar section 43a via the first torsional hinge 33 in the form of a single serpentine beam. As in the aforementioned embodiments, the first torsional hinge 33 can either have a low spring constant against roll relative to the intermediate and third torsional hinges 45a, 45b and 41, which enables the two-part platform to roll substantially independently of the actuator 36 or have a high spring constant against roll, thereby enabling the two-part platform to roll along with the actuator 36 about the longitudinal X axis. In the latter case the first torsional hinge becomes a simple one dimensional hinge, which only enables the two-part platform and the actuator 36 to tilt about Z axes. Actuation of an electrode or some other attraction/repulsion means below an end of the actuator 36 tilts the actuator about a lateral Z axis, which causes the two-part platform to tilt about the lateral Z axis defined by the first and second intermediate torsional hinges 45a and 45b.

Figure 18:
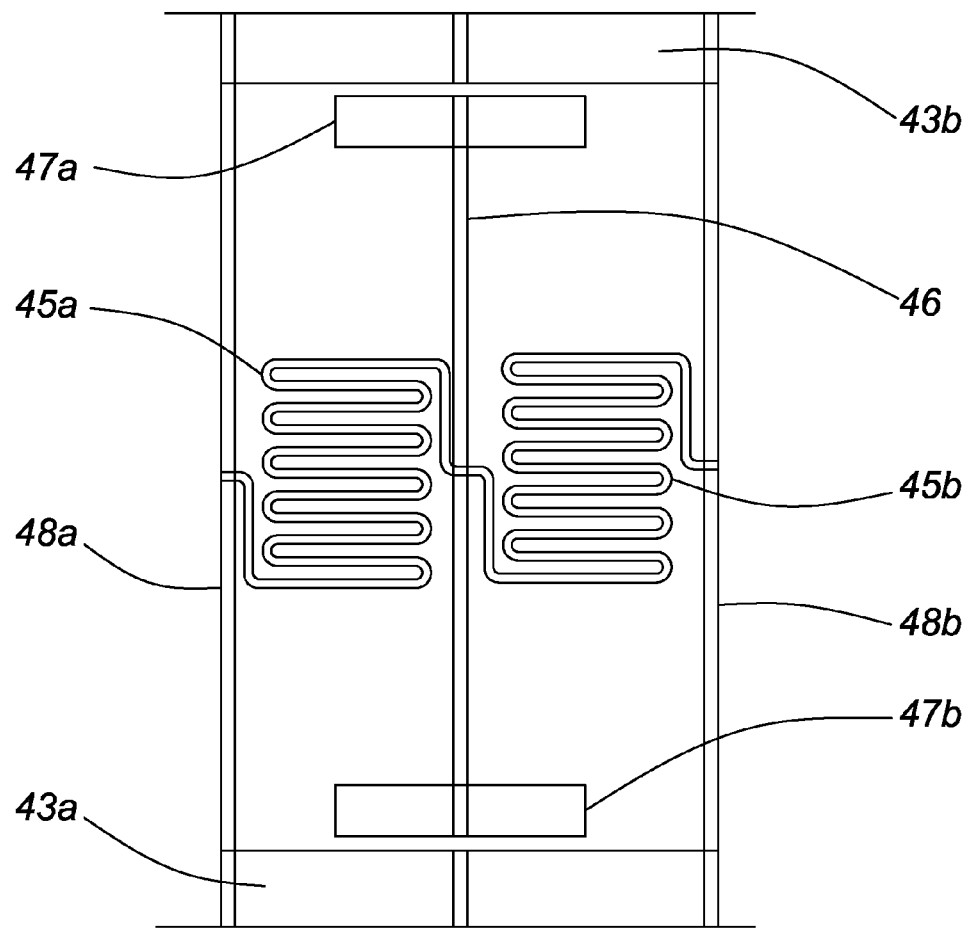
FIG. 18 is a plan view of an alternative hinge for the embodiment of FIG. 17.

In an alternate embodiment illustrated in FIG. 18, inner ends of the first and second intermediate torsional hinges 45a and 45b are connected at a point to a longitudinally extending torsional bar hinge 46, which extends between anchor posts 47a and 47b extending upwardly from the substrate 32. The outer ends of the first and second intermediate torsional hinges 45a and 45b are connected to supports 48a and 48b, respectively, extending between the first and second planar sections 43a and 43b. As above, the distance between the supports 48a and 48b is less than or equal to the width of the first and second planar sections 43a and 43b to enable adjacent devices to be closely packed.

Figure 19:
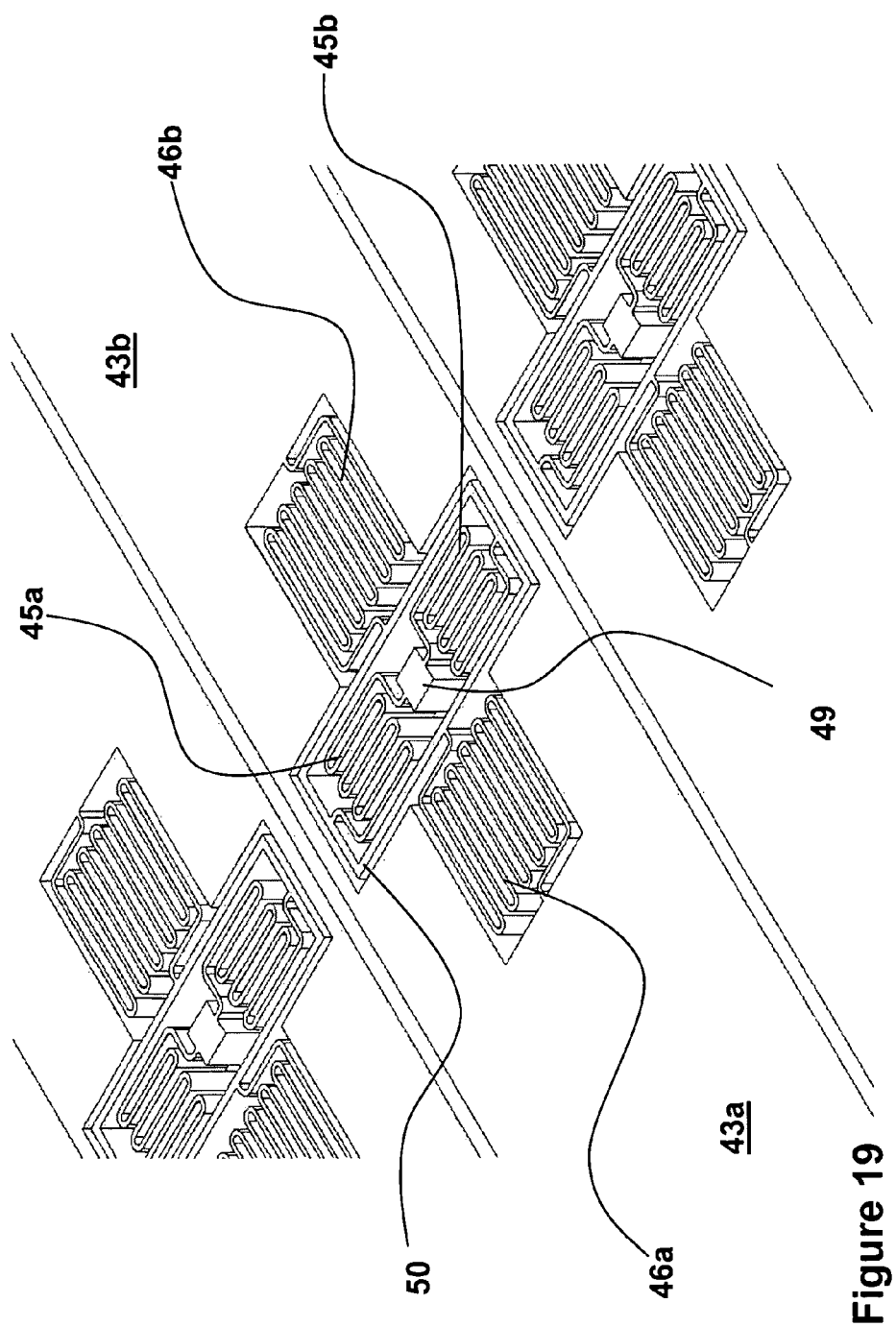
FIG. 19 is an isometric view of an alternative hinge for the embodiment of FIG. 17.

FIG. 19 illustrates yet another embodiment in which the first and second intermediate serpentine (or articulated) torsional hinges 45a and 45b have their inner ends fixed at respective points along the main Z axis to a post 49 extending upwardly from the substrate 32 at the intersection of the main longitudinal and lateral axes. The outer ends of the first and second intermediate hinges 45a and 45b are fixed to a gimbal ring 50, which at least partially surrounds them. The gimbal ring 50 connects the outer ends of the first and second intermediate hinges 45a and 45b together. The longitudinally extending bar hinge 46 takes the form of two serpentine (or articulated) torsional hinges 46a and 46b, each having one end connected to the gimbal ring 50 and one end connected to the first and second planar sections 43a and 43b, respectively, along the main longitudinal axis. The gimbal ring 50 connects the outer ends of the first and second intermediate hinges 45a and 45b to the ends of the two torsional hinges 46a and 46b. As above, the folds of the first and second intermediate hinges 45a and 45b extend laterally facilitating tilting about the Z axis, and the folds of the torsional hinges 46a and 46b extend longitudinally facilitating rolling about the X axis, thereby defining a two dimensional hinge.

Figure 20A:
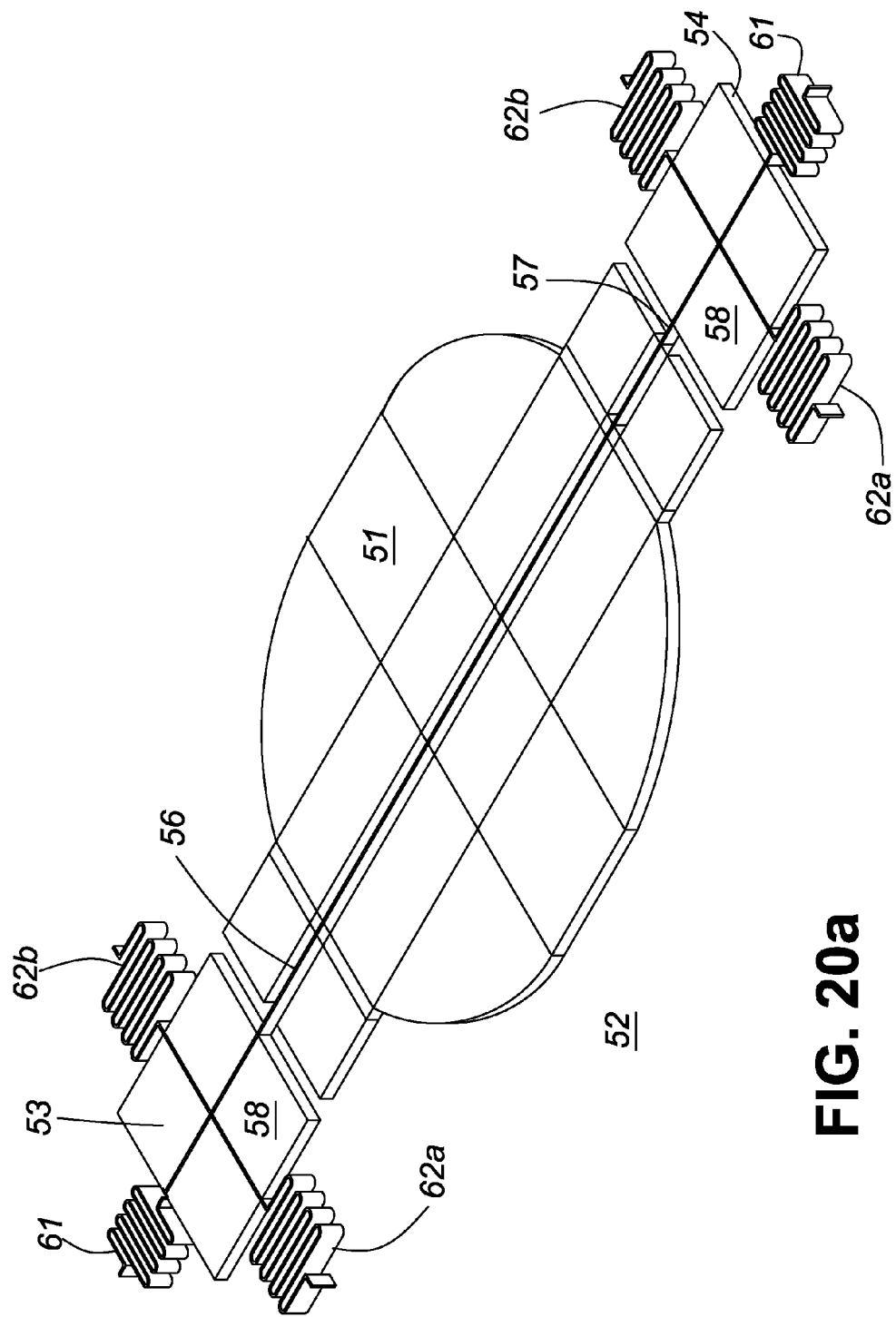
FIG. 20a is an isometric view of an articulated MEMs device according to another embodiment of the present invention.
Figure 20B:
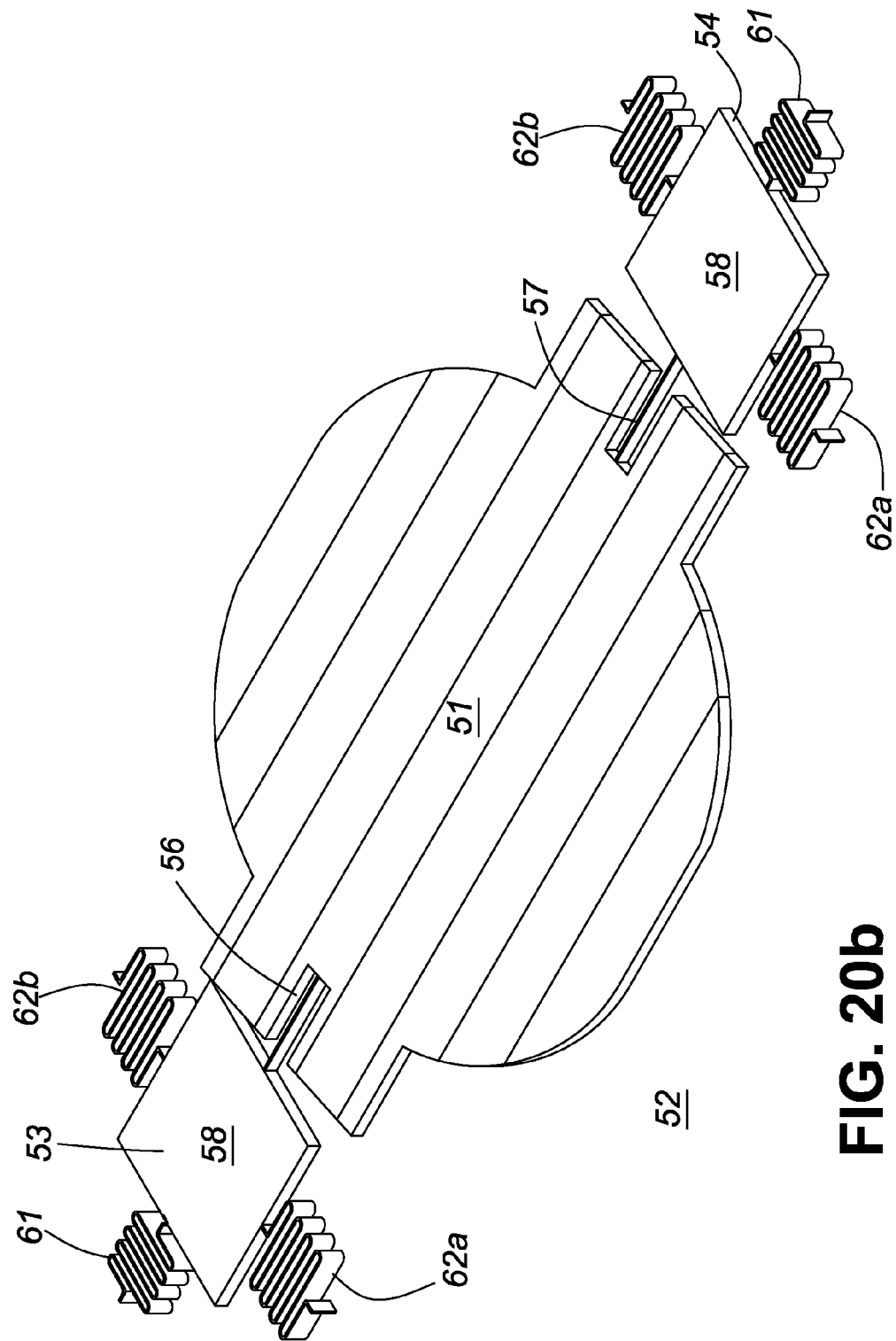
FIG. 20b is an isometric view of the device of FIG. 20a with the platform pivoted about the X-axis.
Figure 20C:
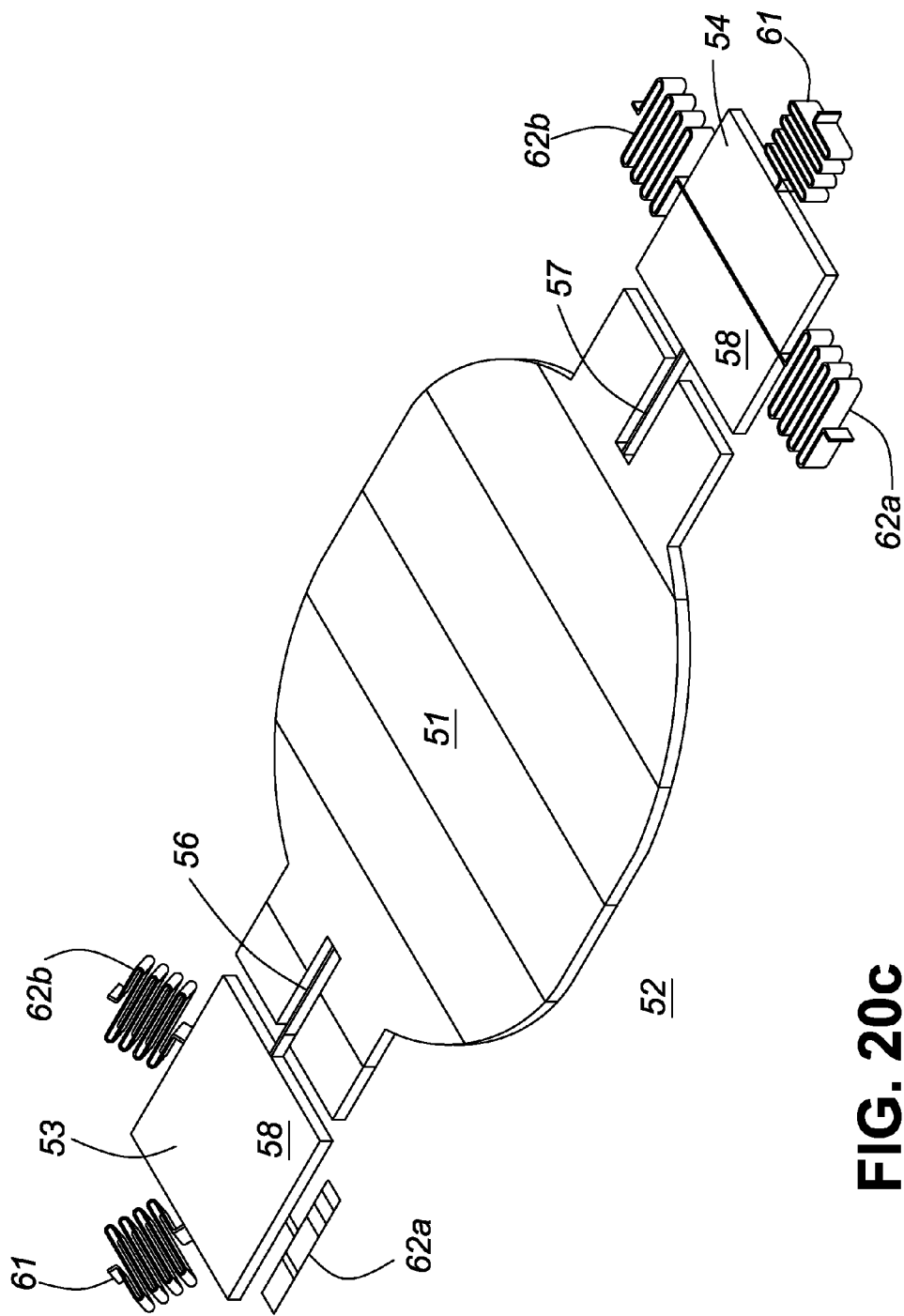
FIG. 20c is an isometric view of the device of FIG. 20a with the platform pivoted about the Z-axis.

In a more complex embodiment, illustrated in FIGS. 20a to 20c, a main platform 51, e.g. circular or rectangular, is pivotable about two perpendicular axes above a substrate 52 utilizing first and second actuators 53 and 54. The main platform 51 is pivotally connected to the first and second actuators 53 and 54 by first and second torsional hinges 56 and 57, respectively, extending from opposite sides of the main platform 51. In the illustrated embodiment the first and second torsional hinges 56 and 57 comprise straight compliant beams, but serpentine beams or other forms of hinges are possible. In the illustrated embodiment, each of the first and second actuators 53 and 54 is comprised of a piston in the form of a rectangular or square platform 58 (although other shapes are possible) suspended above the substrate 52 by a longitudinally extending torsional hinge 61 and a pair of laterally extending torsional hinges 62a and 62b. Each of the longitudinally extending torsional hinges 61 and the laterally extending torsional hinges 62a and 62b comprise serpentine compliant beams fixed to anchors extending from the substrate 52. The beams 61, 62a and 62b are folded such that the folds run perpendicular to a line joining the ends thereof.

To tilt the main platform 51 about its longitudinal axis, i.e. X-axis, as illustrated in FIG. 20b, an electrostatic electrode or some other attracting/repulsing means disposed beneath one side of the main platform 51, i.e. on one side of the longitudinal axis, is actuated to attract or repulse the side of the main platform 51 causing the entire platform 51 to rotate about the first and second torsional hinges 56 and 57.

To rotate the main platform 51 about a lateral axis, i.e. about an axis defined by the pair of laterally extending torsional hinges 62a and 62b, an electrostatic electrode or some other attracting/repulsing means disposed above or beneath one of the square platforms 58 is actuated to attract or repulse the square platform 58 towards or away from the substrate 52, which tilts the main platform 51 (see FIG. 20c). All three of the torsional hinges 61, 62a and 62b stretch downwardly as the square platform 58 is attracted towards the substrate 52. The inherent spring force in the torsional hinges 61, 62a and 62b restores the square platform 58 and therefore the main platform 51 to the horizontal rest position, when the electrode is deactivated. The square platform 58 does not stay horizontal during the reciprocal motion, but, due to the unequal spring forces applied thereto, rotates slightly to enhance the tilting of the main platform 51.

Figure 21:
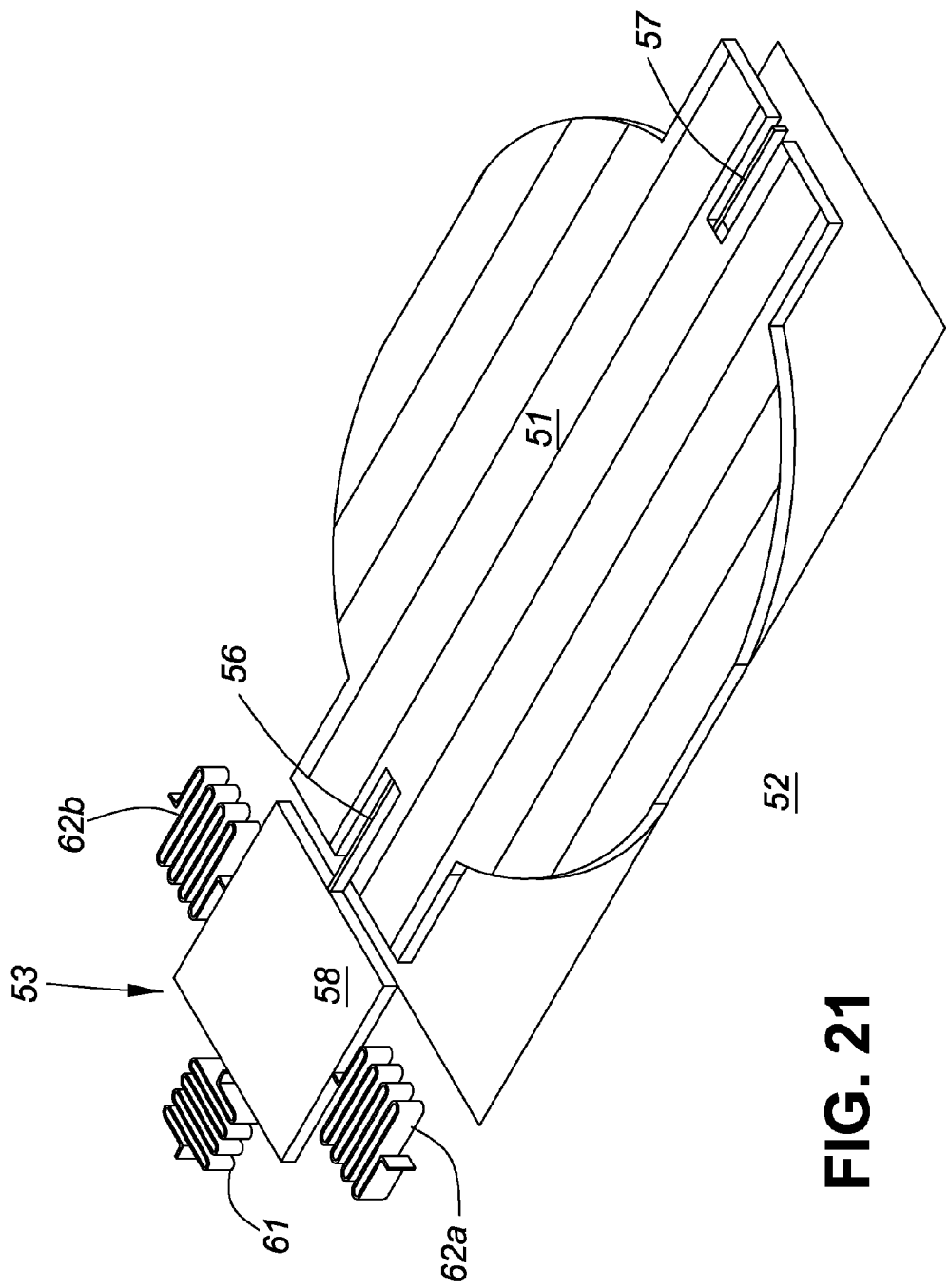
FIG. 21 is an isometric view of an articulated MEMs device according to another embodiment of the present invention.

With reference to FIG. 21, the second actuator 54 can be eliminated, and the second torsional hinge 57 can be attached directly to an anchor. The main platform 51 is rotated in the same manner as above, except that the lateral axis about which the main platform 51 rotates upon reciprocal, i.e. piston-like, movement of the actuator 53 is defined by the second torsional hinge 57 instead of the lateral torsional hinges 62a and 62b. In other words, an attracting/repulsing means, e.g. an electrostatic electrode, disposed beneath one side of the main platform 51, rotates the main platform 51 about its longitudinal X axis, while an attracting/repulsing means disposed beneath the square platform 58 rotates the main platform 51 about the lateral Z axis.

Since all of the aforementioned embodiments provide the actuators, the main platforms and the hinges in the same plane, each embodiment can be constructed unitarily using a single lithographic step followed by a DRIE etch from one or more of the materials selected from the group consisting of silicon, polysilicon, silicon nitride, silicon dioxide, etc.

We claim:

1. An articulated micro-electro-mechanical device suspended above a substrate comprising:
   a main platform having a longitudinal axis pivotable about first and second perpendicular axes;
   a first moveable actuator, one end of which is pivotally connected to the main platform, for pivoting the main platform about the first axis;
   a first actuating means for moving the first moveable actuator, thereby pivoting the main platform about the first axis;
   a second actuating means for pivoting the main platform about the second axis;
   a first torsional hinge pivotally connecting the main platform to the first moveable actuator defining a first spring constant relating to rotation about the second axis;
   a second torsional hinge pivotally connecting the main platform to the substrate defining a second spring constant relating to rotation about the second axis; and
   a third torsional hinge pivotally connecting the moveable actuator to the substrate defining a third spring constant relating to rotation about the second axis.

2. The device according to claim 1, wherein the first spring constant is greater than the second and third spring constants, whereby the main platform and the first moveable actuator will rotate about the second axis together.

3. The device according to claim 1, wherein the third spring constant is greater than the first and second spring constants, whereby the main platform will rotate about the second axis substantially independently of the first moveable actuator.

4. The device according to claim 1, wherein the first torsional hinge comprises a serpentine torsional bar extending between a first end of the main platform and a first end of the first actuator; wherein the second torsional hinge comprises a serpentine torsional bar extending between a second end of the main platform and a first anchor on the substrate; and wherein the third torsional hinge comprises a serpentine torsional bar extending between a second end of the first actuator and a second anchor on the substrate.

5. The device according to claim 1, wherein at least one of the first, second and third torsional hinges comprises a serpentine torsional bar with first folds extending in a first direction facilitating rotation about the first axis, and second folds extending in a second direction facilitating rotation about the second axis.

6. The device according to claim 1, wherein at least one of the first, second and third torsional hinges comprises first and second serpentine torsional bars with folds extending in a first direction facilitating rotation about the first axis, and a third serpentine torsional bar with folds extending in a second direction facilitating rotation about the second axis.

7. The device according to claim 1, wherein at least one of the first, second and third torsional hinges comprises first and second serpentine torsional bars, one on each side of the longitudinal axis of the main platform.

8. The device according to claim 1, wherein the main platform is comprised of first and second planar sections separated by a support.

9. The device according to claim 8, wherein the second torsional hinge comprises two serpentine torsional bars extending between the support and the substrate having ends thereof fixed along a line perpendicular to the longitudinal axis of the main platform.

10. The device according to claim 9, wherein the second torsional hinge further comprises a torsional bar extending along the longitudinal axis of the main platform.

11. The device according to claim 8, wherein the second torsional hinge comprises:
   a first pair of serpentine torsional bars, each one extending from an anchor post, which extends from the substrate through an opening in the main platform, to a gimbal ring, which at least partially surrounds the first pair of serpentine torsional bars; and
   a second pair of serpentine torsional bars, one of the second pair of serpentine torsional bars extending from the gimbal ring to the first planar section, the other of the second pair of serpentine torsional bars extending from the gimbal ring to the second planar section.

12. The device according to claim 1, further comprising: a second moveable actuator, one end of which is pivotally connected to the main platform at an opposite end to the first moveable actuator.

13. The device according to claim 12, further comprising first and second fulcrums extending from the substrate pivotally supporting the first and second moveable actuators, respectively.

14. The device according to claim 1, wherein the first actuating means comprises first attraction/repulsion means above or beneath one end of the first moveable actuator for rotating the first moveable actuator about an axis parallel to the first axis, thereby rotating the main platform about the first axis.

15. The device according to claim 14, wherein the second actuating means comprises second attraction/repulsion means above or beneath the main platform on one side of the longitudinal axis thereof for rotating the main platform about the second axis.

16. The device according to claim 1, further comprising a motion restrictor extending from the substrate for limiting motion of the main platform.

17. The device according to claim 16, wherein the motion restrictor comprises a rod extending upwardly from the substrate into an opening formed in the main platform.

\* \* \* \* \*